(12) United States Patent
Ramasubramonian et al.

(10) Patent No.: US 9,319,679 B2
(45) Date of Patent: Apr. 19, 2016

(54) SIGNALING DATA FOR LONG TERM REFERENCE PICTURES FOR VIDEO CODING

(71) Applicant: QUALCOMM Incorporated, San Diego, CA (US)

(72) Inventors: Adarsh Krishnan Ramasubramonian, San Diego, CA (US); Ye-Kui Wang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 13/828,354

(22) Filed: Mar. 14, 2013

(65) Prior Publication Data

US 2013/0329787 A1    Dec. 12, 2013

Related U.S. Application Data

(60) Provisional application No. 61/656,877, filed on Jun. 7, 2012.

(51) Int. Cl.
*H04N 19/70* (2014.01)
*H04N 19/61* (2014.01)
*H04N 19/58* (2014.01)
*H04N 19/50* (2014.01)

(52) U.S. Cl.
CPC ......... *H04N 19/00569* (2013.01); *H04N 19/58* (2014.11); *H04N 19/61* (2014.11); *H04N 19/70* (2014.11)

(58) Field of Classification Search
None
See application file for complete search history.

(56) References Cited

U.S. PATENT DOCUMENTS

| 8,165,216 | B2* | 4/2012 | Chen et al. | 375/240.24 |
| 8,693,539 | B2* | 4/2014 | Lim et al. | 375/240.12 |
| 2009/0238269 | A1* | 9/2009 | Pandit et al. | 375/240.12 |
| 2009/0262804 | A1* | 10/2009 | Pandit et al. | 375/240.12 |
| 2010/0046619 | A1* | 2/2010 | Koo et al. | 375/240.12 |
| 2010/0189173 | A1* | 7/2010 | Chen et al. | 375/240.02 |
| 2010/0266042 | A1* | 10/2010 | Koo et al. | 375/240.16 |
| 2011/0096835 | A1 | 4/2011 | Lim et al. | |
| 2011/0194613 | A1 | 8/2011 | Chen et al. | |
| 2012/0189053 | A1 | 7/2012 | Chen et al. | |

OTHER PUBLICATIONS

Bross, et al., "High efficiency video coding (HEVC) text specification draft 6," Document JCTVC-H1003, JCTVC 8th Meeting, San Jose, CA, USA, Feb. 1-10, 2012.*
Ramasubramonian et al., "Signaling of Long-Term Reference Pictures in the SPS," Document JCTVC-I0340r2, JCTVC 9th Meeting, Geneva, Switzerland, Apr. 27, 2012 to May 7, 2012.*

(Continued)

*Primary Examiner* — Jay Patel
*Assistant Examiner* — Reza Aghevli
(74) *Attorney, Agent, or Firm* — Shumaker & Sieffert, P.A.

(57) ABSTRACT

A video coder codes a slice header for a slice of video data. The slice header includes a syntax element comprising identifying information for a long term reference picture, wherein the identifying information is explicitly signaled in the slice header or derived from a sequence parameter set corresponding to the slice. When the syntax element indicates that the identifying information for the long term reference picture is explicitly signaled, to code the slice header, the video coder is further configured to code a value for the identifying information for the long term reference picture in the slice header.

56 Claims, 5 Drawing Sheets

(56) References Cited

OTHER PUBLICATIONS

Sjoberg et al., "Overview of HEVC High-Level Syntax and Reference Picture Management," IEEE Trans. on Circuits and Systems for Video Technology, vol. 22, No. 12, Dec. 2012, pp. 1858-1870.*

Schierl et al., System Layer Integration of High Efficiency Video Coding, IEEE Trans. on Circuits and Systems for Video Technology, vol. 22, No. 12, Dec. 2012, pp. 1871-1884.*

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

Bross et al., "High Efficiency Video Coding (HEVC) text specification draft 7," JCT-VC Meeting; MPEG Meeting; Apr. 27-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-I1003_d0, XP030112373, 270 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Deshpande et al., "AHG21: Comments on Signaling of Reference Pictures," JCT-VC Meeting; MPEG Meeting; Feb. 1-10, 2012; San Jose; (Joint Collaborative Team on Video Coding of ISO/IEC JTCI/SC29/WG11 and ITU-T SG.16); URL: http://wftp3.itu.int/av-arch/jctvc-site/,, No. JCTVC-H0531, XP030111558, 5 pp.

International Search Report and Written Opinion—PCT/US2013/040938—ISA/EPO—Sep. 17, 2013, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Ramasubramonian et al., "AHG15: Signalling of long-term reference pictures in the SPS", MPEG Meeting; Apr. 217-May 7, 2012; Geneva; (Motion Picture Expert Group or ISO/IEC JTC1/SC29/WG11), No. m24587; JCTVC-I0340r2, XP030052930, 9 pp.

Samuelsson et al., "Single inclusion of long-term reference pictures in RPS", JCT-VC Meeting; MPEG Meeting; Oct. 10-19, 2012; Shanghai; (Joint Collaborative Team on Video Coding of ISO/IEC JTC1/SC29/WG11 and ITU-T SG.16); URL: http://wftp3.itu.int/av-arch/jctvc-site/, No. JCTVC-K0235, XP030113117, 3 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

Second Written Opinion from International Application No. PCT/US2013/040938, dated May 9, 2014, 10 pp.

* cited by examiner

SIGNALING DATA FOR LONG TERM REFERENCE PICTURES FOR VIDEO CODING

This application claims the benefit of U.S. Provisional Patent Application No. 61/656,877, filed on Jun. 7, 2012, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, such as the scalable video coding (SVC) and multiview video coding (MVC) extensions. The video devices may transmit, receive, encode, decode, and/or store digital video information more efficiently by implementing such video coding techniques.

A recent draft of the upcoming HEVC standard, referred to as "HEVC Working Draft 6" or "WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of Jun. 7, 2012, is downloadable from http://phenix.int-evey.fr/jct/doc_end_user/documents/8 San Jose/wg11/JCTVC-H1003-v22.zip. Another draft of the upcoming HEVC standard, referred to as "HEVC Working Draft 7" or "WD7," is described in document JCTVC-11003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012, which, as of Jun. 7, 2102, is downloadable from http://phenix.it-sudparis.eu/jct/doc_end_user/documents/9_Geneva/wg11/JCTVC-11003-v3.zip.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding tree units, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to deriving a reference picture set (RPS) and signaling of long term reference pictures (LTRPs) to be included in the RPS, e.g., in a sequence parameter set (SPS), picture parameter set (PPS) or in a slice header. These techniques may include ensuring that values of least significant bits (LSBs) of picture order count (POC) values for the LTRPs are non-decreasing or non-increasing. Additionally or alternatively, these techniques may include signaling data for the POC value of an LTRP either in an SPS or in a slice header, and providing information indicating whether the data for the POC value is signaled in the SPS or in the slice header.

In one example, a method of coding video data includes coding a slice header for a slice of video data, wherein the slice header includes a syntax element indicative of whether an identifying information for a long term reference picture is explicitly signaled in the slice header or derived from a sequence parameter set corresponding to the slice, and when the syntax element indicates that the identifying information for the long term reference picture is explicitly signaled, coding the slice header further comprises coding a value for the identifying information for the long term reference picture in the slice header.

In another example, a device for coding video data includes means for coding a slice header for a slice of video data, wherein the slice header includes a syntax element indicative of whether identifying information for a long term reference picture is explicitly signaled in the slice header or derived from a sequence parameter set corresponding to the slice, and means for coding a value for the identifying information for the long term reference picture in the slice header when the syntax element indicates that the identifying information for the long term reference picture is explicitly signaled.

In another example, a device for coding video data, the device comprising a video coder may be configured to: code a slice header for a slice of video data, wherein the slice header includes a syntax element indicative of whether identifying information for a long term reference picture is explicitly signaled in the slice header or derived from a sequence parameter set corresponding to the slice, and when the syntax element indicates that the identifying information for the long term reference picture is explicitly signaled, to code the slice header, the device is further configured to code a value for the identifying information for the long term reference picture in the slice header.

In another example, a non-transitory computer-readable storage medium has stored thereon instructions that, when executed, cause a processor of a device to code video, wherein the instructions cause the processor to: code a slice header for a slice of video data, wherein the slice header includes a syntax element indicative of whether an identifying information for a long term reference picture is explicitly signaled in the slice header or derived from a sequence parameter set corresponding to the slice, and when the syntax element indicates that the identifying information for the long term reference picture is explicitly signaled, to code the slice header, the device is further configured to code a value for the identifying information for the long term reference picture in the slice header.

The details of one or more examples are set forth in the accompanying drawings and the description below. Other features, objects, and advantages will be apparent from the description and drawings, and from the claims.

DETAILED DESCRIPTION

Figure 1:
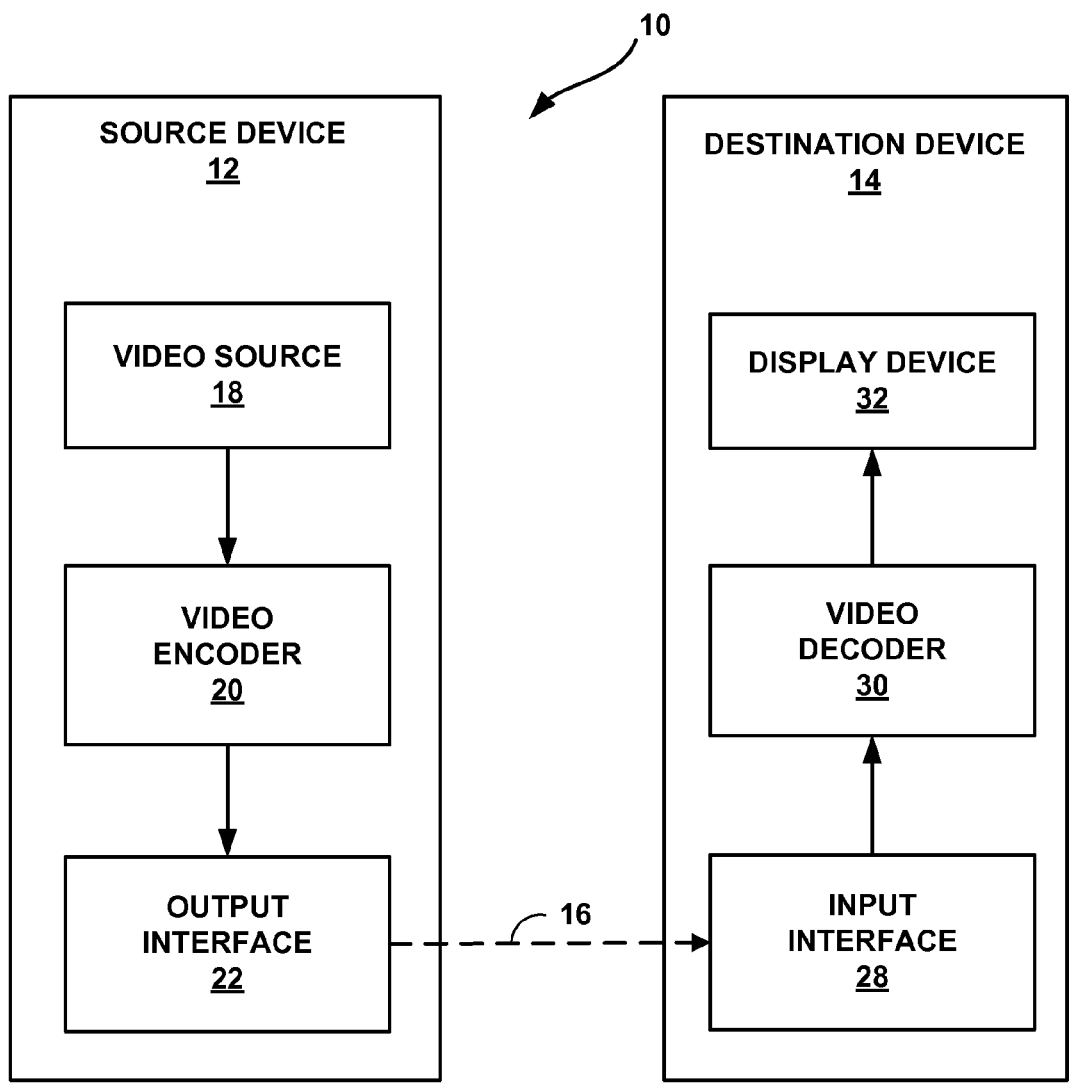
FIG. 1 is a block diagram illustrating an example video encoding and decoding system that may utilize techniques for signaling data for long term reference pictures (LTRPs) in a sequence parameter set (SPS) or slice header.

A video sequence is generally represented as a sequence of pictures. Typically, block-based coding techniques are used to code each of the individual pictures. That is, each picture is divided into blocks, and each of the blocks is individually coded. Coding a block of video data generally involves forming a predicted value for the block and coding a residual value, that is, the difference between the original block and the predicted value. Specifically, the original block of video data includes a matrix of pixel values, and the predicted value includes a matrix of predicted pixel values. The residual value corresponds to pixel-by-pixel differences between the pixel values of the original block and the predicted pixel values.

Prediction techniques for a block of video data are generally categorized as intra-prediction and inter-prediction. Intra-prediction, or spatial prediction, generally involves predicting the block from pixel values of neighboring, previously coded blocks. Inter-prediction, or temporal prediction, generally involves predicting the block from pixel values of previously coded pictures.

The previously coded pictures may represent pictures that are displayed earlier or later than the picture being coded. In other words, the display order for pictures is not necessarily the same as the decoding order of the pictures, and thus, pictures displayed earlier or later than the current picture being coded may be used as reference for coding blocks of the current picture.

For example, a video coder (which is a term that may refer to one or both of a video encoder and a video decoder) includes a decoded picture buffer (DPB). The DPB stores reference pictures, which are pictures that can be used for inter-predicting a picture. In other words, the video coder may predict a picture based on one or more reference pictures stored in the DPB. In general, techniques are described that provide various methods for deriving a reference picture set (RPS) and signaling of long term reference pictures (LTRPs) to be included in the RPS of a coded picture for use when performing inter-prediction aspects of video coding.

The video decoder may also be tasked with constructing reference picture lists that indicate which reference pictures are used for inter-prediction purposes. Two of these reference picture lists are referred to as List 0 and List 1, respectively. The video decoder first employs default construction techniques to construct List 0 and List 1 (e.g., preconfigured construction schemes for constructing List 0 and List 1). Optionally, after the initial List 0 and List 1 are constructed, the decoder may decode syntax elements, when present, that instruct the video decoder to modify the initial List 0 and List 1.

The video encoder may signal syntax elements that are indicative of identifier(s) of reference pictures in the DPB, and the video encoder may also signal syntax elements that include indices, within List 0, List 1, or both List 0 and List 1, that indicate which reference picture or pictures to use to decode a coded block of a current picture. The video decoder, in turn, uses the received identifier to identify the index value or values for a reference picture or reference pictures listed in List 0, List 1, or both List 0 and List 1. From the index value(s) as well as the identifier(s) of the reference picture or reference pictures, the video coder retrieves the reference picture or reference pictures from the DPB, and decodes the coded block of the current picture.

In a picture parameter set (PPS) or a sequence parameter set (SPS) associated with a slice header of a current picture, the video encoder may signal the RPS. The RPS of a current picture includes identification information for reference pictures that can be used to predict the current picture and pictures that can be used to predict pictures following the current picture in decoding order. Only reference pictures in the RPS may be included in List 0 or List 1.

In a coded video bitstream, a video coder (i.e., a video encoder or a video decoder) may utilize two types of values to refer to pictures: picture order count (POC) values, which generally correspond to the output order of the pictures, and frame number (frame_num) values, which generally correspond to the decoding order of the pictures. In general, the terms "frame" and "picture" may be used interchangeably. Hence, frame number values correspond to the decoding order of pictures.

The identification information for the reference pictures may include one or more picture order count (POC) values. POC values indicate the order in which the pictures within a coded video sequence are output or displayed (i.e., the display order of the pictures). For example, a picture with a lower POC value is displayed earlier than a picture with a higher POC value in the same coded video sequence.

In video coding, data for pictures, or slices of pictures, is typically encapsulated in network abstraction layer (NAL) units. NAL units can include video coding layer (VCL) data, such as coded data for pictures or slices, also referred to as VCL NAL units, or non-VCL data, such as parameter sets and supplemental enhancement information (SEI) messages, also referred to as non-VCL NAL units. NAL units also include header data that describes the type of data included in the respective NAL units. For example, NAL units may include a nal_ref_flag indicating whether the NAL unit includes data for a reference picture. In this manner, a reference picture may be defined as a picture with a nal_ref_flag equal to "1." A reference picture may contain samples (that is, pixel values) that may be used for inter prediction in the decoding process of subsequent pictures in decoding order.

In HEVC, there may be more than one type of reference picture. As one example, HEVC defines a long term reference picture, which may be defined as a reference picture that is marked as "used for long term reference." Additionally, HEVC may also include short-term reference pictures, although the techniques of this disclosure are directed toward signaling long term reference pictures. Short-term reference pictures are outside the scope of this disclosure.

HEVC describes techniques for signaling and using long term reference pictures (LTRPs). An example of the conventional signaling of LTRPs is described in HEVC WD6. WD6 also describes adopted techniques related to LTRP signaling, including changes in the signaling of the least significant bits (LSBs) of the LTRPs, the semantics of syntax elements related to LTRPs, and the derivation of reference picture sets. Recent adoptions to HEVC working draft also include techniques that describe the signaling of LTRPs in sequence parameter sets (SPSs). The adoptions related to signaling of LTRPs in SPSs are described in JCTVC-I0340r2 as adopted into HEVC WD7, is described in Ramasubramonian et al, "Signaling of Long term Reference Pictures in the SPS," document JCTVC-I0340r2, 9$^{th}$ Meeting JCT-VC of ITU-T SG16 WP3 and ISO/IEC JTC1/SC29/WG11, Geneva, Switzerland, Apr. 27, 2012 to May 7, 2012, which is available from http://phenix.int-evey.fr/jct/doc_end_user/documents/9_Geneva/wg11/JCTVC-I0340-v3.zip. The details of signaling LTRPs in an SPS are summarized below.

In the techniques described in JCTVC-I0340r2, an SPS may include a flag syntax element that indicates whether LTRPs are signaled (i.e. whether or not the video coder uses LTRPs for inter-prediction) for the coded video sequence. If LTRPs are signaled for the coded video sequence, syntax elements of the active SPS or the slice header for the coded video sequence may refer to the LTRPs using a number of LSBs of the POC for the LTRP. Using only the LSBs of the POC to refer to the LTRPs may improve coding efficiency and reduce the complexity of the coded video bitstream. The video coder signals the number of LTRP LSBs used to reference each LTRP in the SPS in a first syntax element, followed by a list of LSBs of the POC values of the LTRPs.

In a coded video sequence, a slice header may inherit or reference one or more LTRPs of the SPS. In the slice header, the video coder signals a list syntax element that includes the LSB values of POC values for the LTRPs to be inherited from the SPS. In addition to the LTRPs inherited from the SPS, the slice header may also explicitly signal the LSBs of additional LTRPs that are not inherited from the SPS. The slice header includes a syntax element that includes a list of the LSB values of the POC values for the LTRPs explicitly signaled in the slice header.

In some cases, two LTRPs may have the same sequence of POC LSBs, creating an ambiguity as to which LTRP a particular POC LSB syntax element refers. To clarify which LTRP the syntax element refers, a slice header or SPS may signal some of the most significant bits (MSBs) for an LTRP if more than one reference picture in the decoded picture buffer (DPB) has the same LSBs. A flag syntax element is used to indicate whether the MSBs for an LTRP is signaled, and the signaling of the MSB information for the LTRP, if present, immediately follows this flag. Finally, the video coder may code a flag to indicate whether the signaled LTRP may be used by the current picture as a reference picture. The syntax and the semantics of the related syntax elements in the SPS and the slice header are described below. For those syntax elements that are included in the syntax table but no semantics are provided, the semantics are the same as in HEVC WD6.

JCTVC-I0340r2 provides the SPS syntax and semantics described below with respect to Table 1:

TABLE 1

| seq_parameter_set_rbsp( ) { | Descriptor |
|---|---|
| ... | |
| num_short_term_ref_pic_sets | ue(v) |
| for( i = 0; i < num_short_term_ref_pic_sets; i++) | |
| short_term_ref_pic_set( i ) | |
| long_term_ref_pics_present_flag | u(1) |
| if( long_term_ref_pics_present_flag ) { | |
| num_long_term_ref_pics_sps | ue(v) |
| for( i = 0; i < num_long_term_ref_pics_sps; i++ ) | |
| lt_ref_pic_poc_lsb_sps[ i ] | u(v) |
| } | |
| ... | |
| } | |

The semantics of the syntax elements of the SPS modified by JCTVC-I0340r2 are described below:

num_long_term_ref_pics_sps specifies the number of long term reference pictures that are specified in the sequence parameter set. The value of num_long_term_ref_pics_sps is in the range of 0 to 32, inclusive.

lt_ref_pic_poc_lsb_sps[i] specifies the least significant bits of the picture order count of the i-th long term reference picture specified in the sequence parameter set. The number of bits used to represent lt_ref_pic_poc_lsb_sps[i] is equal to log 2_max_pic_order_cnt_lsb_minus4+4.

JCTVC-I0340r2 also modified slice header syntax and semantics, as described below with respect to Table 2:

TABLE 2

| slice_header( ) { | Descriptor |
|---|---|
| ... | |
| if( IdrPicFlag ) { | |
| idr_pic_id | ue(v) |
| no_output_of_prior_pics_flag | u(1) |
| } else { | |
| pic_order_cnt_lsb | u(v) |
| short_term_ref_pic_set_sps_flag | u(1) |
| if( !short_term_ref_pic_set_sps_flag ) | |
| short_term_ref_pic_set( | |
| num_short_term_ref_pic_sets ) | |
| else | |
| short_term_ref_pic_set_idx | u(v) |
| if( long_term_ref_pics_present_flag ) { | |
| num_long_term_pics | ue(v) |
| if( num_long_term_ref_pics_sps ) | |
| num_long_term_sps | ue(v) |
| for( i = 0; i < num_long_term_sps + num_long_term_pics; i++ ) { | |
| if ( i < num_long_term_sps ) | |
| long_term_idx_sps[ i ] | ue(v) |
| else | |
| poc_lsb_lt[ i ] | u(v) |
| delta_poc_msb_present_flag[ i ] | u(1) |
| if( delta_poc_msb_present_flag[ i ] ) | |
| delta_poc_msb_cycle_lt[ i ] | ue(v) |
| used_by_curr_pic_lt_flag[ i ] | u(1) |
| } | |
| } | |
| } | |
| ... | |
| } | |

The semantics of the syntax elements of the slice header modified by JCTVC-I0340r2 are described below:

num_long_term_pics specifies the number of the long term reference pictures that are to be included in the long term reference picture set of the current picture and that are directly signaled in the slice header. The value of num_long_term_pics is in the range of 0 to sps_max_dec_pic_buffering[sps_max_temporal_layers_minus1]−NumNegativePics[StRpsIdx]−NumPositivePics[StRpsIdx]−num_long_term_sps, inclusive. When not present, the video coder infers the value of num_long_term_pics to be equal to 0.

num_long_term_sps specifies the number of long term reference pictures that are specified in the active sequence parameter set and that are to be included in the long term reference picture set of the current picture. If num_long_term_sps is not present, the video coder infers the value to be equal to 0. The value of num_long_term_sps is in in the range of 0 to Min(num_long_term_ref_pics_sps, max_dec_pic_buffering[max_temporal_layers_minus1]−NumNegativePics[StRpsIdx]−NumPositivePics[StRpsIdx]−num_long_term_pics), inclusive.

long_term_idx_sps[i] specifies the index, to the list of long term reference pictures specified in the active sequence parameter set, of the i-th long term reference picture inherited from the referred sequence parameter set to the long term reference picture set of the current picture. The value of long_term_idx_sps[i] is in the range of 0 to num_long_term_ref_pics_sps−1, inclusive.

poc_lsb_lt[i] specifies the value of the least significant bits of the picture order count value of the i-th long term reference picture that is included in the long term reference picture set of the current picture. The length of the poc_lsb_lt[i] syntax element is log 2_max_pic_order_cnt_lsb_minus4+4 bits. For any values of j and k in the range of num_long_term_sps to num_long_term_pics+num_long_term_sps−1, inclusive, if j is less than k, poc_lsb_lt[j] shall not be less than poc_lsb_lt[k].

The variable PocLsbLt[i] is derived as follows.

```
if( i < num_long_term_sps )
    PocLsbLt[ i ] =
        lt_ref_pic_poc_lsb_sps[ long_term_idx_sps[ i ] ]
else
    PocLsbLt[ i ] = poc_lsb_lt[ i ].
```

That is, for indices zero to num_long_term_sps, the value of PocLsbLt[i] is obtained using an index into the lt_ref_pic_poc_lsb_sps, which is signaled in the slice header. For indices of PocLsbLt greater than num_long_term_sps, the value of PocLsbLt[i] is the POC LSBs of LTRPs explicitly signaled in the slice header.

delta_poc_msb_present_flag[i] equal to 1 specifies that the delta_poc_msb_cycle_lt[i] syntax element is present. delta_poc_msb_present_flag[i] equal to 0 specifies that delta_poc_msb_cycle_lt[i] is not present, and therefore, that no MSBs are signaled for the slice header because there is only one reference picture in the DPB having LSBs equal to PocLsbLt[i]. delta_poc_msb_present_flag[i] is equal to 1 when there is more than one reference picture in the decoded picture buffer with the least significant bits of the picture order count value equal to PocLsbLt[i].

delta_poc_msb_cycle_lt[i] is used to determine the value of the most significant bits of the picture order count value of the i-th long term reference picture that is included in the long term reference picture set of the current picture. The video coder uses the value of delta_poc_msb_cycle_lt[i] to determine the MSBs of the i-th LTRP.

The variable DeltaPocMSBCycleLt[i] is derived as described in the following pseudocode:

```
if( i = = 0 || PocLsbLt[ i − 1 ] != PocLsbLt[ i ] )
    DeltaPocMSBCycleLt[ i ] = delta_poc_msb_cycle_lt[ i ]
else
    DeltaPocMSBCycleLt[ i ] = delta_poc_msb_cycle_lt[ i ] +
        DeltaPocMSBCycleLt[ i − 1 ]
```

The value of DeltaPocMSBCycleLt[i]*MaxPicOrderCntLsb+pic_order_cnt_lsb−PocLsbLt[i] is in the range of 1 to $2^{24}-1$, inclusive, for techniques conforming to JCTVC-I0340r2.

used by curr_pic_lt_flag[i] equal to 0 specifies that the i-th long term reference picture included in the long term reference picture set of the current picture is not used for reference by the current picture. Thus, based on the values of used by curr_pic_lt_flag[i], a subset of reference pictures inherited from the SPS or explicitly signaled in the slice header may be used for reference by the current picture.

JCTVC-I0340r2 also modified a decoding process for a reference picture set. In accordance with JCTVC-I0340r2, This process is invoked once per picture, after decoding of a slice header but prior to the decoding of any coding unit and prior to the decoding process for reference picture list construction of the slice as specified in subclause 8.3.3 of HEVC WD6. The process may result in marking one or more reference pictures as "unused for reference." JCTVC-I0340r2 includes the following modifications to HEVC WD6:

```
for( i = 0, j = 0, k = 0; i < NumNegativePics[ StRpsIdx ] ; i++ )
    if( UsedByCurrPicS0[ StRpsIdx ][ i ] )
        PocStCurrBefore[ j++ ] = PicOrderCntVal + DeltaPocS0[ StRpsIdx ][ i ]
    else
        PocStFoll[ k++ ] = PicOrderCntVal + DeltaPocS0[ StRpsIdx ][ i ]
NumPocStCurrBefore = j
for( i = 0, j = 0; i < NumPositivePics[ StRpsIdx ]; i++ )
    if( UsedByCurrPicS1[ StRpsIdx ][ i ] )
        PocStCurrAfter[ j++ ] = PicOrderCntVal + DeltaPocS1[ StRpsIdx ][ i ]
    else
        PocStFoll[ k++ ] = PicOrderCntVal + DeltaPocS1[ StRpsIdx ][ i ]
NumPocStCurrAfter = j
NumPocStFoll = k                                                              (8-5)
for( i = 0, j = 0, k = 0; i < num_long_term_sps + num_long_term_pics; i++ )
    if( delta_poc_msb_present_flag[ i ] )
        if( used_by_curr_pic_lt_flag[ i ] )
            PocLtCurr[ j++ ] = PicOrderCntVal −       DeltaPocMSBCycleLt[ i ] *
MaxPicOrderCntLsb −
                pic_order_cnt_lsb + PocLsbLt[ i ]
        else
            PocLtFoll[ k++ ] = PicOrderCntVal − DeltaPocMSBCycleLt[ i ] *
```

```
MaxPicOrderCntLsb                              −   piC_order_cnt_lsb +
PocLsbLt[ i ]
    else
        if( used_by_curr_pic_lt_flag[ i ] )
            PocLtCurr[ j++ ] = PocLsbLt[ i ]
        else
            PocLtFoll[ k++ ] = PocLsbLt[ i ]
NumPocLtCurr = j
NumPocLtFoll = k
```

One of the potential problems associated with the existing design for signaling LTRPs relates to the semantics of the flag delta_poc_msb_present_flag[i]. In the latest semantics as described above, the delta_poc_msb_present_flag[i] is equal to 1 when there is more than one reference picture in the decoded picture buffer with the least significant bits of the picture order count value equal to PocLsbLt[i]. The value of delta_poc_msb_present_flag[i] thus depends on the reference pictures in the decoded picture buffer (DPB). Even if there are reference pictures in the DPB that are marked as "unused for reference," the value of delta_poc_msb_present_flag[i] will depend on those pictures too. This may not be desirable, as the pictures in DPB that are marked "unused for reference" are present and only waiting to be output and are no longer used for reference. Whether such pictures are present in the DPB generally depends on the decoder output schedule.

Given a bitstream, systems and applications may apply different output schedules based on the available memory that can be used to store decoded pictures. Thus, counting such pictures may not only unnecessarily increase the chance of requiring the value of delta_poc_msb_present_flag[i] to be 1, thus requiring more bits to signal the LTRPs, but may also introduce bitstream conformance and interoperability problems. As an example, when a decoder actually uses more DPB memory than the minimum required, a conforming bitstream may appear as non-conforming to the decoder as more pictures only waiting to be output, and no longer used for reference, may be present in the DPB (compared to a decoder that uses exactly the minimum required DPB memory) and thus, the decoder may not even be able to correctly decode the bitstream.

Another potential problem with the semantics described above relates to the signaling of long_term_idx_sps[i]. The semantics as described above do not restrict the order in which LTRPs inherited from the SPS are signaled. This lack of ordering restriction may also be inefficient, because a video coder may utilize more bits than are necessary in order to signal information, such as the MSBs and LSBs of the LTRPs. As an example, assume that MaxPicOrderCntLsb equals 256, and two LSBs are signaled in the SPS—0 and 10. Suppose for a picture with POC 2560, that the video coder is to signal three LTRPs, having POC 0, 10, and 256, respectively. For pictures with POC 0 and 256, a video encoder conforming to the above-described LTRP signaling techniques would have to signal the MSB cycles for both LTRPs. However, the techniques of this disclosure may improve the efficiency of such signaling. In particular, certain inefficiencies are demonstrated by Table 3 below. That is, Table 3 provides an example of inefficient signaling of LTRPs inherited from a corresponding SPS. In this example, "i" describes a particular long term reference picture, LTRP POC describes the POC value of the corresponding long term reference picture, PocLsbLt describes the least significant bits (LSBs) of the POC value for the long term reference picture inherited from the SPS, delta_poc_msb_present_flag indicates whether delta_poc_msb_cycle_lt is signaled, and delta_poc_msb_cycle_lt is used to determine the value of the most significant bits (MSBs) of the POC value for the long term reference picture, when signaled.

TABLE 3

| i | 0 | 1 | 2 |
|---|---|---|---|
| LTRP POC | 0 | 10 | 256 |
| PocLsbLt | 0 | 10 | 0 |
| delta_poc_msb_present_flag | 1 | 0 | 1 |
| delta_poc_msb_cycle_lt | 10 | — | 9 |

This disclosure describes techniques for signaling identifying information for long term reference pictures, which may provide advantages over the signaling techniques described above in some instances. In some examples, the techniques of this disclosure may reduce the number of bits used to signal syntax elements including the MSBs of LTRPs. One better way of signaling the pictures may be to define a picture coding order of LTRPs, i.e. an order that the LTRPs are coded in the poc_lsb_lt [i], such that the LSBs of the LTRPs are either non-decreasing (or, with substantially similar performance effect, non-increasing), as described in Table 4. Coding the LSBs of the LTRPs in non-decreasing or non-increasing order may result in the video coder signalling fewer MSB bits in some examples. By ordering LTRPs in non-increasing or non-decreasing LSB order, the video coder will successively signal any LTRPs with equal LSBs in the picture coding order of the poc_lsb_lt syntax element.

If two LTRPs have equal LSB values, the video coder may code data representative of the MSB of at least one of the two LTRPs (e.g., the delta_poc_msb_cycle_lt syntax element). A video coder may encode data representative of the MSB as a difference of the MSB value of the second LTRP and the MSB of the first LTRP. To determine the MSB value of an LTRP from the signaled values of delta_poc_msb_cycle_lt[i], a video coder may calculate the DeltaPocMSBCycleLt[i] variable as the sum of delta_poc_msb_cycle_lt [i] and delta_poc_msb_cycle_lt [i−1]. In the case where there is no previous LTRP in the picture coding order, the video coder may signal the difference of the MSB of the LTRP and the MSB of the current picture in the value of delta_poc_msb_cycle_lt syntax element.

As an example, using previous techniques for LTRP MSB signalling illustrated in Table 3, the video coder may signal the LTRP with POC value of 0 as the first LTRP in the picture count order (i=0), and the value of the delta_poc_msb_cycle_lt as 10 for POC 0. The video coder may signal the LTRP with POC value 256 as the third LTRP in the picture count order (i.e., i=2), and the delta_poc_msb_cycle_lt value as 9 for the LTRP.

Whereas the video coding techniques described with respect to Table 3 signal 10 as the value of delta_poc_msb_ cycle_lt for POC 0, the video coder conforming to the techniques of this disclosure may signal data that can be used to reproduce the MSB of the LTRP as an offset that may be the difference between the MSB cycle value of the POC of the current LTRP and the MSB of the POC of the previous LTRP. As illustrated in Table 4, video coder may restrict the picture count order in non-decreasing order of the LSBs of each LTRP that is inherited from the SPS. The result of this ordering is that LTRPs with POC 256, POC 0, which both have LSBs equal to 0, are ordered first and second, respectively, and the LTRP with POC 10 is ordered third in the picture count order. The video coder signals the MSB cycle value of the LTRP with POC 256 as 9 because it is the first LTRP in the picture count order, and the MSB cycle value of the second LTRP as the difference between the current LTRP MSB (10) and the previous LTRP MSB (9) i.e., 10−9=1, so the video coder signals 1 as the value for delta_poc_msb_cycle_lt[i]. Signalling the value of 1 may require fewer bits as compared to signalling the value 10, resulting in an improvement of coding efficiency for signalling of the delta_poc_msb_cycle_lt syntax element in this example. Thus, the techniques of this disclosure, described with respect to Table 4 may reduce the number of bits required to signal MSBs for POC values of LTRPs inherited from a corresponding SPS for a coded video sequence.

TABLE 4

| i | 0 | 1 | 2 |
|---|---|---|---|
| LTRP POC | 256 | 0 | 10 |
| PocLsbLt | 0 | 0 | 10 |
| delta_poc_msb_present_flag | 1 | 1 | 0 |
| delta_poc_msb_cycle_lt | 9 | 1 | — |

As discussed above, to overcome the problems noted above associated with signaling MSBs of LTRPs, this disclosure describes various techniques for signaling of long term reference pictures (LTRPs) to be included in the SPS of a coded picture and indexing the LTRPs in the slice header of the coded picture sequence either explicitly, by signaling the LSB of the POC value of the LTRP in the slice header, or otherwise by signaling in the slice header an index to the entry in the list of LSBs of LTRPs in the SPS which determines the LSB of the POC of the LTRP. This disclosure also describes modifications to the semantics of delta_poc_msb_present_flag[i] which may be applied to ensure that the value of the flag only depends on the pictures that are marked as "used for reference." These and other techniques are described in greater detail below.

FIG. 1 is a block diagram illustrating an example video encoding and decoding system 10 that may utilize techniques for signaling data for LTRPs in an SPS or slice header. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for signaling data for LTRPs in an SPS. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for signaling data for LTRPs in an SPS may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) (also referred to as "coding tree units") that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Accordingly, video encoder 20 may encode a series of LCUs forming a slice of a picture. Moreover, video encoder 20 may utilize the techniques of this disclosure to encode a slice header for the slice. The slice header may include data that can be used during decoding of the slice. For example, the slice header may include data indicative of reference pictures that may be used during decoding of video data included in the slice. In accordance with the techniques of this disclosure, video encoder 20 may encode data of the slice header that indicates whether data representative of identifying information for a particular long term reference picture is explicitly coded in the slice header, or whether such identifying information is inherited from a sequence parameter set (SPS) corresponding to a sequence of pictures including a picture in which the slice occurs.

Likewise, video decoder 30 may utilize the techniques of this disclosure to decode the slice header, which may include decoding the data indicating whether identifying information for a particular long term reference picture is explicitly coded in the slice header, or whether the identifying information is inherited from an SPS corresponding to the slice. If the slice header indicates that the identifying information is explicitly coded, video decoder 30 may decode the identifying information for the long term reference picture from the slice header. However, if the slice header indicates that the identifying information is inherited from the SPS, video decoder 30 may retrieve the identifying information for the SPS from the SPS. Techniques for coding a slice header are explained in greater detail below.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

As noted above, video encoder 20 and video decoder 30 may be configured to inter- or intra-predict PUs of a CU. In general, inter-coding involves prediction relative to one or more reference pictures. A reference picture may be a previous picture in temporal order, a future picture, or a combination of predictions from two or more previously encoded pictures. Video encoder 20 or video encoder 20 may store the reference pictures in a decoded picture buffer (DPB). Video encoder 20 may signal a NAL unit value that indicates that a picture is to be used as a reference picture by marking the picture as a short-term reference picture or a long term reference picture. Video encoder 20 and video decoder 30 store the long term and short-term reference pictures in a reference picture list. Video encoder 20 or video encoder 20 may store long term reference pictures in the DPB for a longer time than short-term reference pictures, and may therefore be used as reference pictures for more pictures than short-term reference pictures.

Video encoder 20 or video decoder 30 may remove reference pictures from the DPB in a number of ways. When the reference pictures are no longer needed, video encoder 20 or video decoder 30 may mark the reference picture as no longer needed for reference, and may eventually remove the pictures no longer needed for reference from the DPB, e.g., by outputting the reference picture for display, or by discarding the reference picture if the reference picture has already been output for display. If the DPB is full, the video encoder 20 or video decoder 30 may remove the oldest short-term reference picture.

In addition to storing reference pictures in the DPB, video encoder 20 or video decoder 30 store reference pictures in one of two reference pictures lists, referred to as list 0 and list 1. The reference pictures stored in list 0 and list 1 that are used to predict a particular picture may be referred to as the reference picture set (RPS). The pictures stored in list 0 and list 1 may come from a variety of different sources, such as the SPS, and the PPS. As described above, the slice header may also explicitly signal pictures to be included in the RPS. is defined as a set of reference pictures associated with a picture, consisting of all reference pictures that are prior to the associated picture in decoding order, that may be used for inter prediction of blocks in the associated picture or any picture following the associated picture in decoding order, for example, until the next instantaneous decoding refresh (IDR) picture, or broken link access (BLA) picture. In other words, reference pictures in the reference picture set may require the following characteristics: (1) they are all prior to the current picture in decoding order, and (2) they may be used for inter-predicting the current picture and/or inter-predicting any picture following the current picture in decoding order, and in some examples, until the next IDR picture or BLA picture.

Video encoder 20 or video decoder 30 may derive the RPS, and after such derivation, may construct the reference picture lists, e.g., list 0 and list 1. Video encoder 20 or video decoder 30 may utilize reference pictures from list 0 when predicting a p-slice, and reference pictures from list 0 or list 1 when predicting a bi-predicted slice. Only reference pictures in the RPS may be candidate reference pictures that are used to construct the reference picture lists.

To construct the reference picture set, the video coder may construct a plurality of reference picture subsets. WD 9 describes five reference picture subsets that video decoder constructs. The combination of the reference picture subsets may together form the reference picture set. For example, video encoder 20 may explicitly signal, in a coded bitstream, values that allow a video decoder to determine identifiers for the reference pictures that are included in the reference picture set. For instance, the identifiers of the reference pictures may the picture order counts. Each picture is associated with one POC value. The POC value of a picture indicates the output order or display order of the corresponding picture relative to the previous IDR picture in decoding order, and, in some other alternatives, indicates the position of the associated picture in output order relative to the output order positions of the other pictures in the same coded video sequence. For example, within a coded video sequence, a picture with a smaller POC value is outputted or displayed earlier than a picture with larger POC value.

As described above, reference pictures are stored in the DPB, and may be signaled in the SPS, PPS or the slice header. The PPS may inherit a subset of reference pictures from the SPS, and may signal additional reference pictures that may be used to signal pictures that video encoder 20 or video decoder 30 may use during inter-prediction of the current picture. The video coder may determine identifiers for the reference pictures, e.g., POC values or other identifiers and from these identifiers construct the plurality of reference picture subsets.

There may be various ways in which video decoder 30 may determine the identifiers for pictures that belong to the reference picture set. In general, video encoder 20 may signal values from which video decoder 30 may determine the identifiers for pictures, including the pictures that belong to the reference picture set. The identifiers of the pictures may be the POC for each of the pictures. As described above, the POC value may indicate the display or output order of a picture, where pictures with smaller POC values are displayed earlier than pictures with larger POC values. The POC value of a given picture may be relative to the previous IDR picture. For example, the PicOrderCnt (i.e., POC value) for an IDR picture may be 0, the POC value for the picture after the IDR picture in display or output order may be 1, the POC value for the after the picture with POC value 1 in display or output order may be 2, and so forth.

From these reference picture subsets, the video decoder may derive the reference picture set, as described in more detail below. In some examples, each of the reference picture subsets include different reference pictures, in that there is no overlap of reference pictures in the reference picture subsets. In this way, each of the reference pictures may be in only one of the reference picture subsets, and in no other reference picture subset.

After determining the identifiers (e.g., POC values) of the reference pictures in the reference picture set or its subsets, the video decoder may construct the reference picture subsets. As described in more detail below, the video decoder may construct five reference picture subsets, although it may be possible for the video decoder to construct more or fewer reference picture subsets.

These five reference picture subsets are named: RefPicSetStCurrBefore, RefPicSetStCurrAfter, RefPicSetStFoll, RefPicSetLtCurr and RefPicSetLtFoll.

RefPicSetStCurrBefore, RefPicSetStCurrAfter, and RefPicSetStFoll reference picture subsets may identify short-term reference pictures. In some examples, these reference picture subsets may identify short-term reference pictures based on whether the short-term reference pictures are earlier in display order or later in display order than the current picture being coded, as well as whether the short-term reference pictures can potentially be used for inter-predicting the current picture and pictures following the current picture in decoding order, or can potentially be used for inter-predicting only the pictures following the current picture in decoding order.

For example, the RefPicSetStCurrBefore reference picture subset may include, and may only include, identification information, such as POC values, of all short-term reference pictures that have an earlier output or display order than the current picture, and that can potentially be used for reference in inter-prediction of the current picture, and can potentially be used for reference in inter-prediction of one or more pictures following the current picture in decoding order. The RefPicSetStCurrAfter reference picture subset may include, and may only include, identification information of all short-term reference pictures that have a later output or display order than the current picture and that can potentially be used for reference in inter-prediction of the current picture, and can potentially be used for reference in inter-prediction of one or more pictures following the current picture in decoding order.

The RefPicSetStFoll reference picture subset may include, and may only include, identification information of all short-term reference pictures that have an earlier output or display order than the current picture, that can potentially be used for reference in inter-prediction of one or more pictures following the current picture in decoding order, and that cannot be used for reference in inter-prediction of the current picture.

The RefPicSetLtCurr and the RefPicSetLtFoll reference picture subsets may identify long term reference pictures. In some examples, these reference picture subsets may identify long term reference pictures based on whether the long term reference pictures are earlier in display order or later in display order than the current picture being coded.

For example, the RefPicSetLtCurr reference picture subset may include, and may only include, the identification information of all long term reference pictures that can potentially be used for reference in inter-prediction of the current picture, and that can potentially be used for reference in inter-prediction of one or more pictures following the current picture in decoding order. The RefPicSetLtFoll reference picture subset may include, and may only include, the identification information of all long term reference pictures that can potentially be used for reference in inter-prediction of one or more pictures following the current picture in decoding order, and that cannot be used for reference in inter-prediction of the current picture.

In some examples, the RefPicSetStCurrBefore, RefPicSetStCurrAfter, and RefPicSetLtCurr subsets may include all reference pictures that may be used in inter-prediction of a block in the current picture and that may be used in inter-prediction of one or more of the pictures following the current picture in decoding order. The RefPicSetStFoll, and RefPicSetLtFoll subsets may include all reference pictures that are not used in inter-prediction of the block in the current picture, but may be used in inter-prediction of one or more of the pictures following the current picture in decoding order.

To construct the RefPicSetLtCurr and RefPicSetLtAfter reference picture subsets, the video decoder iterates through the DPB and adds LTRPs stored in the DPB to the RefPicSetLtCurr and RefPicSetLtAfter reference picture subsets in accordance with the following pseudocode:

```
for( i = 0; i < NumPocLtCurr; i++ )
    if( !CurrDeltaPocMsbPresentFlag[ i ] )
        if( there is a long term reference picture picX in the DPB with
                pic_order_cnt_lsb equal to PocLtCurr[ i ] )
            RefPicSetLtCurr[ i ] = picX
        else if( there is a short-term reference picture picY in the DPB
                with pic_order_cnt_lsb equal to PocLtCurr[ i ] )
            RefPicSetLtCurr[ i ] = picY
        else
            RefPicSetLtCurr[ i ] = "no reference picture"
    else
        if( there is a long term reference picture picX in the DPB
                with PicOrderCntVal equal to PocLtCurr[ i ] )
            RefPicSetLtCurr[ i ] = picX
        else if( there is a short-term reference picture picY in the DPB
                with PicOrderCntVal equal to PocLtCurr[ i ] )
            RefPicSetLtCurr[ i ] = picY
        else
            RefPicSetLtCurr[ i ] = "no reference picture"
for( i = 0; i < NumPocLtFoll; i++ )
    if( !FollDeltaPocMsbPresentFlag[ i ] )
        if( there is a long term reference picture picX in the DPB
                with pic_order_cnt_lsb equal to PocLtFoll[ i ] )
            RefPicSetLtFoll[ i ] = picX
        else if( there is a short-term reference picture picY in the DPB
                with pic_order_cnt_lsb equal to PocLtFoll[ i ] )
            RefPicSetLtFoll[ i ] = picY
        else
            RefPicSetLtFoll[ i ] = "no reference picture"
    else
        if( there is a long term reference picture picX in the DPB
                with PicOrderCntVal to PocLtFoll[ i ] )
            RefPicSetLtFoll[ i ] = picX
        else if( there is a short-term reference picture picY in the
                DPB with PicOrderCntVal equal to PocLtFoll[ i ] )
            RefPicSetLtFoll[ i ] = picY
        else
            RefPicSetLtFoll[ i ] = "no reference picture"
```

After building the RefPicSetLtCurr, and RefPicSetLtFoll reference picture lists, video decoder 30 marks each of the pictures in the referenced pictures as "used for long term reference."

To construct the RefPicSetStCurrBefore, RefPicSetStCurrAfter, and RefPicSetLtCurr reference picture sets, video decoder 30 may execute the following pseudocode, which iterates through the DPB, and adds pictures from the DPB with POC values to the corresponding reference picture set:

```
for( i = 0; i < NumPocStCurrBefore; i++ )
    if( there is a short-term reference picture picX in the DPB
        with PicOrderCntVal equal to PocStCurrBefore[ i ])
        RefPicSetStCurrBefore[ i ] = picX
    else
        RefPicSetStCurrBefore[ i ] = "no reference picture"
for( i = 0; i < NumPocStCurrAfter; i++ )
    if( there is a short-term reference picture picX in the DPB
        with PicOrderCntVal equal to PocStCurrAfter[ i ])
        RefPicSetStCurrAfter[ i ] = picX
    else
        RefPicSetStCurrAfter[ i ] = "no reference picture"   (8-7)
for( i = 0; i < NumPocStFoll; i++ )
    if( there is a short-term reference picture picX in the DPB
        with PicOrderCntVal equal to PocStFoll[ i ])
        RefPicSetStFoll[ i ] = picX
    else
        RefPicSetStFoll[ i ] = "no reference picture"
```

Video decoder 30 marks any reference pictures that are not included in one of the five reference picture subsets are marked as "unused for reference."

If the current picture to be decoded is an IDR picture, video decoder 30 may set the RefPicSetStCurrBefore, RefPicSetStCurrAfter, RefPicSetStFoll, RefPicSetLtCurr, and RefPicSetLtFoll reference picture subsets to empty. This may be because the IDR picture may not be inter-predicted and that no picture after the IDR picture in decoding order can use any picture prior to the IDR picture in decoding for reference. Otherwise (e.g., when the current picture is non-IDR picture), video decoder 30 may construct the short-term reference picture subsets and the long term reference picture subsets by implementing the following pseudo code.

Once video decoder 30 derives the reference picture set from the plurality of reference picture subsets, the video decoder may construct the reference picture lists (e.g., list 0 and list 1) from the reference picture set. For example, the construction of the reference picture lists may include an initialization step and possibly a modification step.

In some examples, the video decoder may be configured to implement a default reference list construction technique in which the video decoder utilizes the reference picture subsets for constructing initial reference picture lists. Then, if reference picture list modification is not needed, the final reference picture lists may be the same as the initial reference picture lists, without needing any additional reordering of the reference picture lists.

During inter-prediction of a unidirectionally predicted PU, video encoder 20 or video decoder 30 uses the reference pictures of reference picture list 0 to predict the current and luma chroma values of the current block. During the inter-prediction of a bi-directionally predicted PU, video encoder 20 or video decoder 30 uses the reference pictures of both reference picture list 0 and reference picture list 1 to predict the values of the current luma and chroma blocks.

Video decoder 30 may address reference pictures, such as LTRPs and STRPs by indexing into one of the two lists of reference pictures, referred to as RefPicList0, and RefPicList1. RefPicList0 and RefPicList1 include reference pictures from the five reference picture subsets, RefPicSetStCurrBefore, RefPicSetStCurrAfter, RefPicSetStFoll, RefPicSetLtCurr and RefPicSetLtFoll. When decoding a uni-directionally predicted PU, video decoder 30 may utilize one of the pictures stored in of RefPicList0 to predict the values of the current luma and chroma blocks. When decoding a bi-predicted PU, video decoder 30 may utilize a picture of RefPicList0 and a picture of RefPicList1 to predict the CUs of the current slice. At the beginning of decoding a P or a B slice, video decoder 30 may construct a temporary reference picture lists, RefPicList0, in accordance with the following pseudocode:

```
rIdx = 0
while( rIdx < NumRpsCurrTempList0 ) {
    for( i = 0; i < NumPocStCurrBefore && rIdx <
    NumRpsCurrTempList0; rIdx++, i++ )
        RefPicListTemp0[ rIdx ] = RefPicSetStCurrBefore[ i ]
    for( i = 0; i < NumPocStCurrAfter && rIdx <
NumRpsCurrTempList0; rIdx++, i++ )
        RefPicListTemp0[ rIdx ] = RefPicSetStCurrAfter[ i ]
    for( i = 0; i < NumPocLtCurr && rIdx < NumRpsCurrTempList0;
rIdx++, i++ )
        RefPicListTemp0[ rIdx ] = RefPicSetLtCurr[ i ]
}
``` where RefPicListTemp0 is a temporary variable that includes the contents of RefPicSetStCurrBefore, followed by RefPicSetStCurrAfter, and RefPicSetLtCurr.

In some cases, the bitstream may signal that pictures in RefPicList0 should be re-ordered. Video decoder 30 may reorder RefPicListTemp0 based on a ref_pic_list modification_flag_l0. After constructing RefPicListTemp0, video decoder 30 constructs RefPicList0 in accordance with the following pseudocode:

```
for( rIdx = 0; rIdx <= num_ref_idx_l0_active_minus1; rIdx++)
    RefPicList0[ rIdx ] = ref_pic_list_modification_flag_l0 ?
        RefPicListTemp0[ list_entry_l0[ rIdx ] ] :
            RefPicListTemp0[ rIdx ]
```

When the current PU is bi-predicted, video decoder 30 constructs a temporary version of RefPicList1, referred to as RefPicListTemp1 in accordance with the following pseudocode in a similar process used to construct RefPicListTemp0:

```
rIdx = 0
while( rIdx < NumRpsCurrTempList1 ) {
    for( i = 0; i < NumPocStCurrAfter && rIdx <
    NumRpsCurrTempList1; rIdx++, i++ )
        RefPicListTemp1[ rIdx ] = RefPicSetStCurrAfter[ i ]
    for( i = 0; i < NumPocStCurrBefore && rIdx <
NumRpsCurrTempList1; rIdx++, i++ )
        RefPicListTemp1[ rIdx ] = RefPicSetStCurrBefore[ i ]
    for( i = 0; i < NumPocLtCurr && rIdx <
NumRpsCurrTempList1; rIdx++, i++ )
        RefPicListTemp1[ rIdx ] = RefPicSetLtCurr[ i ]
}
```

Video decoder 30 may reorder RefPicListTemp1 based on ref_pic_list modification_flag_l1 in accordance with the following pseudocode:

```
for( rIdx = 0; rIdx <= num_ref_idx_l1_active_minus1; rIdx++)
    RefPicList1[ rIdx ] = ref_pic_list_modification_flag_l1 ?
    RefPicListTemp1[list_entry_l1[ rIdx ] ] :
        RefPicListTemp1[ rIdx ]
```

As described above, the HEVC bitstream includes coding units (CUs) which are comprised of prediction units (PUs)

and transform units (TUs). For inter-predicted PUs, each prediction unit may include motion prediction information, such as the particular inter-prediction mode of the PU, one or more motion vector difference values (MVDs), and reference pictures to be used when predicting the pixel values of the CU. There may be one or two reference pictures signaled for each PU, one reference picture if the CU is uni-directionally predicted, and two reference pictures if the CU is bi-directionally predicted.

An inter-predicted PU of a slice may include syntax elements, ref_idx_l0, and ref_idx_l1. The value of each of ref_idx_l0 and ref_idx_l1 are indices into the reference picture lists, RefPicList0, and RefPicList1, respectively. ref_idx_l0 and ref_idx_l1 signal the reference pictures that video decoder uses in conjunction with the motion vector difference values to determine a set of prediction samples that video decoder 30 uses to predict the chroma and luma values of the current block.

In an instance where a PU is uni-directionally or bi-directionally predicted, video decoder 30 uses the MVD values of the PU to reconstruct one or more chroma motion vectors and luma motion vectors. Video decoder 30 may reconstruct the luma and chroma motion vectors by determining a motion vector predictor for the CU and combining the motion vector predictor with the MVD to form the motion vector for the CU. Video decoder 30 may determine the motion vector predictor from another, previously coded CU, e.g., a neighboring, previously coded CU. In some instances, a PU may be coded using so-called merge more or advanced motion vector prediction (AMVP), in which video decoder 30 determines the motion vector predictor for the current PU only based on one or more motion vectors of previously coded CUs. In this case, the current PU does not include any signaled MVD values.

Once video decoder 30 has reconstructed the chroma and luma motion vectors for the current PU, video decoder 30 determines an array of luma prediction samples, an array of chroma prediction samples, and an array of chroma residual samples based on the one or more reference pictures signaled by their indices in the PU. To calculate the luma prediction samples (e.g., predictive values) for the current luma block, video decoder 30 calculates an integer portion and a fractional portion of the luma motion vector. Video decoder 30 adds the x and y-coordinates of the top-left corner of the current luma block with the luma motion vector to determine a corresponding integer or fractional offset for the luma samples of the indicated reference picture. Based on the offset, video encoder 20 may interpolate the values of fractional sub-positions based on whole pixel values of the luma samples of the reference picture to determine the luma prediction samples for the current luma block. As an example, the luma motion vector difference, when combined with the motion vector predictor, may reference a particular quarter-pixel location of the luma prediction samples. Video decoder 30 may interpolate the quarter-pixel values based on one or more interpolation filters. The interpolation filters may utilize whole pixel sets of support from the luma reference samples to generate the quarter-pixel values. Video decoder 30 may utilize the generated quarter-pixel luma values as the predictive values of the current luma block.

Video decoder 30 may perform a similar process to determine prediction samples for the current chroma block. Video decoder 30 reconstructs at least one chroma motion vector, which may differ from the luma motion vector, and utilizes the chroma motion vector to determine an offset into the chroma samples of the reference picture. Also, whereas the luma motion vector may have up to quarter-pixel precision, the chroma motion vector may have up to eighth-pixel precision. Based on the offset into the chroma samples of the reference picture, video decoder 30 may interpolate predictive sub-pixel chroma values as predictors of the chroma values of the current chroma block.

In cases, where the current PU is bi-predicted, video decoder 30 determines two arrays of luma prediction samples, one for each of the two luma motion vectors, and two arrays of chroma prediction samples, one for each of the two chroma motion vectors. Video decoder 30 combines the two luma prediction samples and the two arrays of chroma prediction samples to form a single array of prediction samples. The technique used to predict each the luma and chroma sample arrays is dependent upon two prediction flags syntax elements, predFlagL0 and preFlagL1, which indicate which of two weighted sample prediction processes video decoder 30 performs. The specific weights assigned to each of the two arrays of chroma and luma prediction samples is defined by a weighted prediction syntax table, which may be signaled in a slice segment header.

Following intra-predictive or inter-predictive coding using the PUs of a CU, video encoder 20 or video decoder 30 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 or video decoder 30 may form the TUs including the residual data for the CU, and then transform the TUs to produce transform coefficients for the CU.

Following any transforms to produce transform coefficients, video encoder 20 or video decoder 30 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 or video decoder 30 may utilize a predefined scan order to scan the quantized transform coefficients to produce a serialized vector that can be entropy encoded. In other examples, video encoder 20 or video decoder 30 may perform an adaptive scan. After scanning the quantized transform coefficients to form a one-dimensional vector, video encoder 20 or video decoder 30 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

The techniques of this disclosure are directed toward techniques for improving the signaling of reference pictures in a coded video bitstream. In general, to save bits when signaling references to POC values of reference pictures, WD6 indicates that only a certain number of least-significant bits (LSBs) of POC values are signaled to refer to long term reference pictures, whereas short-term reference pictures are identified by the full POC value.

This disclosure provides techniques related to signaling of long term reference pictures, which video encoder 20 and video decoder 30 may implement. In particular, this disclosure describes techniques for signaling identifying information for long term reference pictures, e.g., in a slice header. In particular, the techniques of this disclosure are directed toward techniques for improving the signaling of the most significant bits (MSBs) and least significant bits of long term reference pictures in the slice header of a coded video sequence. The techniques of this disclosure are also directed toward techniques for signaling, in the slice header, additional reference pictures which are not included in the set of reference pictures included in the active sequence parameter set or picture parameter set for the currently coding picture.

A first aspect of the techniques of this disclosure is directed to the signaling of long term reference pictures, and more particularly to the signaling of the most significant bits of long term reference bits in the slice header of a coded video sequence. In general, the techniques of this disclosure may implement the slice header syntax as that described with respect to Table 2 above. In accordance with Table 2, the slice header includes the long_term_idx_sps[i] and the poc_lsb_lt syntax elements. For a particular index value i, the value of long_term_idx_sps[i] specifies an index into the list of candidate long term reference pictures from the active sequence parameter set, and the value of poc_lsb_lt[i] specifies the least significant bits for the $i^{th}$ long term reference picture.

In this manner, the long_term_idx_sps and poc_lsb_lt syntax elements identify a subset of the long term reference pictures that are inherited from the sequence parameter set, and which video decoder 30 uses to predict the CUs of the current slice. The techniques of this disclosure restrict the order of the LTRP POC LSB values inherited from the SPS in the long_term_idx_sps[i] syntax element. Restricting the order of the LTRP POC LSB values of long_term_idx_sps[i] in accordance with the techniques of this disclosure may reduce the complexity of a coded video bitstream. Accordingly, the semantics of the slice header syntax elements of Table 2 may be modified as follows, relative to the semantics described with respect to Table 2 above.

For a particular index, i, the value of long_term_idx_sps[i] specifies the index, to the list of long term reference pictures specified in the active sequence parameter set, of the $i^{th}$ long term reference picture inherited from the referred sequence parameter set to the long term reference picture set of the current picture. The value of long_term_idx_sps[i] may be in the range of 0 to num_long_term_ref_pics_sps−1, inclusive.

The techniques of this disclosure further modify the ordering of the values of poc_lsb_lt, such that for any values of j and k in the range of 0 to num_long_term_sps−1, inclusive, if j is less than k, lt_ref_pic_poc_lsb_sps[long_term_idx_sps [j]] is not be less than lt_ref_pic_poc_lsb_sps[long_term_idx_sps[k]]. In this example, the LSB POC values of long_term_idx_sps[j] is not be less than the LSB POC values of long_term_idx_sps [k], for all j<k.

The slice header may also include the delta_poc_msb_present_flag[i] syntax element. delta_poc_msb_present_flag[i] specifies whether or not a specified number of MSBs are signaled for the i-th LTRP, i.e. the LTRP indicated by long_term_idx_sps[i] or poc_lsb_lt[i]. If the i-th index of delta_poc_msb_present_flag [i] equal to 1, the delta_poc_msb_cycle_lt[i] value is present. If the value of delta_poc_msb_present_flag[i] is equal to 0, the delta_poc_msb_cycle_lt[i] is not present for the i-th LTRP signaled. The techniques of this disclosure modify the signaling of delta_poc_msb_present_flag[i] such that delta_poc_msb_present_flag [i] is only signaled equal to 1 when there is more than one picture in the decoded picture buffer, and that reference picture marked as "used for reference" and has the least significant bits of the picture order count value equal to PocLsbLt[i]. Previous techniques may signal delta_poc_msb_present_flag [i] equal to one, and the delta_poc_msb_lt[i] values even when the picture is not marked as "used for reference," i.e., when the picture is no longer needed for reference. By restricting the signaling of delta_poc_msb_present_flag[i] to pictures marked as "used for reference," the techniques of this disclosure may reduce the frequency of signaling the MSBs of a reference picture, which may reduce the complexity of a coded video bitstream.

The slice header may also include the delta_poc_msb_cycle_lt[i] syntax element. Video decoder 30 may utilize the delta_poc_msb_cycle_lt[i] value to determine the value of the most significant bits of the picture order count value of the i-th long term reference picture that is included in the long term reference picture set of the current picture. To determine the MSB value of the i-th LTRP, the video coder may determine a value of variable, DeltaPocMSBCycleLt[i], which indicates the MSB of the i-th LTRP.

The video coder may derive the variable DeltaPocMSB-CycleLt[i] according to the following pseudocode:

```
if( i = = 0 || i = = num_long_term_sps || PocLsbLt[ i − 1 ] ! = PocLsbLt[ i ] )
    DeltaPocMSBCycleLt[ i ] = delta_poc_msb_cycle_lt[ i ]
else
    DeltaPocMSBCycleLt[ i ] = delta_poc_msb_cycle_lt[ i ] +
        DeltaPocMSBCycleLt[ i − 1 ]
```

The value of DeltaPocMSBCycleLt[i]*MaxPicOrderCntLsb+pic_order_cnt_lsb−PocLsbLt[i] may be in the range of 1 to $2^{24}−1$, inclusive.

In some instances, video decoder 30 determines DeltaPocMSBCycleLt[i] by adding the value of DeltaPocMSBCycleLt[i−1], the DeltaPocMSB value of the previous LTRP, to the delta_poc_msb_cycle_lt[i] value of the current LTRP.

As compared to the previous technique for determining DeltaPocMSBCycleLt[i], DeltaPocMSBCycleLt[i] is defined to be delta_poc_msb_cycle_lt[i] if i is equal to the number of LTRPs specified in the active SPS and that are to be included in the set of LTRPs for the current picture.

In an alternative example in accordance with the techniques of this disclosure (which may be combined with the example discussed above), the slice header syntax may be substantially the same as in Table 2. However, the slice header may also include a syntax element, "lt_pic_from_sps_flag[i]," as described below. The order of POC LSB values inherited from the SPS and POC LSB values directly signaled in the slice header may be collectively restricted through a constraint on the values of the array PocLsbLt[i]. The restriction on the delta_poc_msb_present_flag[i] may be the same as in the example described above. Table 5 provides an example of the syntax for a slice header in accordance with this example:

TABLE 5

| slice_header( ) { | Descriptor |
|---|---|
| ... | |
| if( IdrPicFlag ) { | |
| idr_pic_id | ue(v) |
| no_output_of_prior_pics_flag | u(1) |
| } else { | |
| pic_order_cnt_lsb | u(v) |
| short_term_ref_pic_set_sps_flag | u(1) |
| if( !short_term_ref_pic_set_sps_flag ) | |
| short_term_ref_pic_set( | |
| num_short_term_ref_pic_sets ) | |
| else | |
| short_term_ref_pic_set_idx | u(v) |
| if( long_term_ref_pics_present_flag ) { | |
| num_long_term_pics | ue(v) |
| if( num_long_term_ref_pics_sps ) | |
| num_long_term_sps | ue(v) |
| for( i = 0; i < num_long_term_sps + num_long_term_pics; i++ ) { | |
| if ( num_long_term_sps ) | |
| lt_pic_from_sps_flag[ i ] | u(1) |
| if ( lt_pic_from_sps_flag[ i ] ) | |
| long_term_idx_sps[ i ] | ue(v) |
| else | |
| poc_lsb_lt[ i ] | u(v) |
| delta_poc_msb_present_flag[ i ] | u(1) |
| if( delta_poc_msb_present_flag[ i ] ) | |
| delta_poc_msb_cycle_lt[ i ] | ue(v) |
| used_by_curr_pic_lt_flag[ i ] | u(1) |
| } | |
| } | |
| } | |
| ... | |
| } | |

As noted above, Table 5 provides an additional syntax element, "lt_pic_from_sps_flag[i]." Video decoder 30 may use lt_pic_from_sps_flag[i] to determine whether the i-th LTRP signaled in the slice header is derived from the SPS or explicitly signaled in the slice header. When the flag is 1, the LTRP may be inherited from the SPS and corresponds to index that is signaled. When the flag is 0, the LSB of the long term reference picture may be explicitly signaled. When not present, the video coder may infer lt_pic_from_sps_flag[i] to be equal to 0.

In this manner, lt_pic_from_sps_flag[i] represents an example of a syntax element, which may be coded in a slice header, that indicates whether identifying information for a long term reference picture is explicitly signaled in a slice header or derived from a sequence parameter set including a sequence of pictures in which the slice occurs (i.e., a sequence parameter set corresponding to the slice).

In this example, long_term_idx_sps[i] may specify the index, to the list of long term reference pictures specified in the active sequence parameter set, of the i-th long term reference picture to the long term reference picture set of the current picture. The value of long_term_idx_sps[i] may be in the range of 0 to num_long_term_ref_pics_sps−1, inclusive.

In this example, poc_lsb_lt[i] may specify the value of the least significant bits of the picture order count value of the i-th long term reference picture that is included in the long term reference picture set of the current picture. The length of the poc_lsb_lt[I] syntax element may be log 2_max_pic_order_cnt_lsb_minus4+4 bits. The variable PocLsbLt[i] may specify the LSBs for the i-th LTRP.

The variable PocLsbLt[i] may be derived as follows in the following pseudocode:

```
if(lt_pic_from_sps_flag[ i ])
    PocLsbLt[ i ] = lt_ref_pic_poc_lsb_sps
        [ long_term_idx_sps[ i ] ]
else
    PocLsbLt[ i ] = poc_lsb_lt[ i ]
```

For any values of j and k in the range of 0 to num_long_term_pics+num_long_term_sps−1, inclusive, if j is less than k, PocLsbLt[j] is be restricted so as not be less than PocLsbLt[k]. Thus, PocLsbLt[i] is defined as the LSBs of the reference picture inherited from the SPS if the LTRP is inherited from the SPS, and as the LSBs explicitly signaled in the slice header if the LTRP is not inherited from the SPS. Additionally, the LSBs are restricted so as to be in non-increasing order.

The changes to the semantics of delta_poc_msb_present_flag[i] and delta_poc_msb_cycle_lt[i] may be the same as described in the example above, and the derivation of the variable DeltaPocMSBCycleLt[i] may be the same as the method with respect to Table 2 above.

Alternatively, num_long_term_pics may specify the total number of LTRPs signaled including those inherited from the SPS and those explicitly signaled in the slice header, and the video coder need not signal num_long_term_sps.

Video encoder 20 and video decoder 30 may be configured to code data of a slice header and/or a sequence parameter set in accordance with the various examples of syntax and semantics described above. In this manner, video encoder 20 and video decoder 30 may realize a bit savings, e.g., by signaling fewer most significant bits for certain long term reference pictures.

Accordingly, video encoder 20 and video decoder 30 represent examples of a video coder configured to code a slice header for a slice of video data, wherein the slice header includes a syntax element indicative of whether identifying information for a long term reference picture is explicitly signaled in the slice header or derived from a sequence parameter set corresponding to the slice, and, when the syntax element indicates that the identifying information for the long term reference picture is explicitly signaled, code a value for the LSB for the long term reference picture in the slice header.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
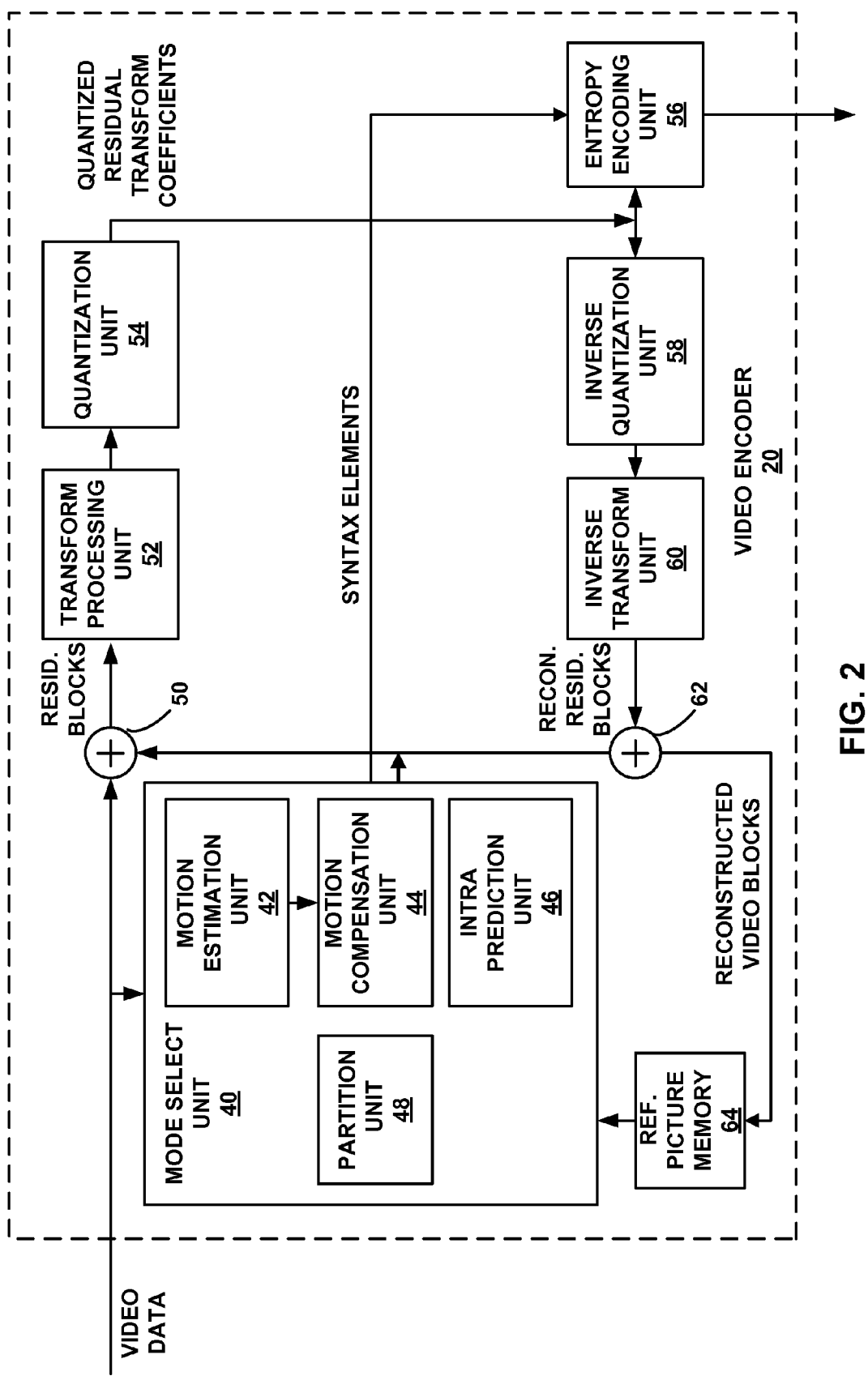
FIG. 2 is a block diagram illustrating an example of a video encoder that may implement techniques for signaling data for LTRPs in an SPS or slice header.

FIG. 2 is a block diagram illustrating an example of video encoder 20 that may implement techniques for signaling data for LTRPs in an SPS or slice header. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Motion estimation unit 42 may determine one or more reference pictures, that video encoder 20 may use to predict the pixel values of one or more For PUs that are inter-predicted. Motion estimation unit 42 may signal each reference picture as an LTRP or a short-term reference picture. Motion estimation unit 42 may store the reference pictures in a decoded picture buffer (DPB) until the pictures are marked as unused for reference.

Mode select unit 40 of video encoder 20 may encode various syntax elements that include identifying information for one or more reference pictures. During the encoding of an inter-predicted picture, mode select unit 40 may encode identifying information of one or more LTRPs for the current picture in a sequence parameter set. Mode select unit 40 may also encode identifying information for one or more short-term reference pictures used for predicting the current picture in the slice header of the current picture or the picture parameter set for the current picture. In some examples, the syntax elements may indicate whether or not the slice header inherits long term reference pictures from the active sequence parameter set, or whether the long term reference picture is explicitly signaled in the slice header.

In this manner, mode select unit 40 of video encoder 20 in FIG. 2 represents an example of a video encoder configured to code a slice header for a slice of video data, wherein the slice header includes a syntax element indicative of whether identifying information for a long term reference picture is explicitly signaled in the slice header or derived from a sequence parameter set corresponding to the slice, and, when the syntax element indicates that the identifying information for the long term reference picture is explicitly signaled, code a value for the identifying information for the long term reference picture in the slice header.

In some examples, video encoder 20 may signal the identifying information of the long term reference pictures by signaling only some of the LSBs of the POC values of the long term reference pictures in the active SPS or the slice header. However, in some instances, two LTRPs may have the same POC LSBs, so video encoder 20 may additionally signal some of the MSBs of the POC values of the LTRPs.

In another example of the techniques of this disclosure, video encoder 20 may signal a list of LTRPs used to predict the pixel values of the current slice within the syntax elements of the current slice header. Video encoder 20 may code data for a plurality of pictures in a coding order. The data may indicate that each of the plurality of pictures is available for use as an LTRP. Video encoder 20 may code a syntax element in the slice header of the current picture that includes values for least significant bits (LSBs) of respective picture order count (POC) values of the plurality of pictures such that the values for the LSBs are either non-decreasing or non-increasing in the picture coding order.

Based on the reference pictures signaled in the SPS, PPS, and slice header, video encoder 20 constructs lists of reference pictures, such as the RefPicSetStCurrBefore, RefPicSetStCurrAfter, RefPicSetStFoll, RefPicSetLtCurr and RefPicSetLtFoll reference picture lists. Video encoder 20 may construct the reference picture lists based on the POC values of the reference pictures. Based on the five reference picture lists, video encoder 20 may also construct the RefPicList0 and RefPicList1 reference picture lists. Video encoder 20 may use the reference pictures of included in the RefPicList0 and RefPicList1 to predict the pixel values of a bi-predicted block, and the reference pictures of RefPicList0 to predict the pixel values of a uni-predicted block.

Figure 3:
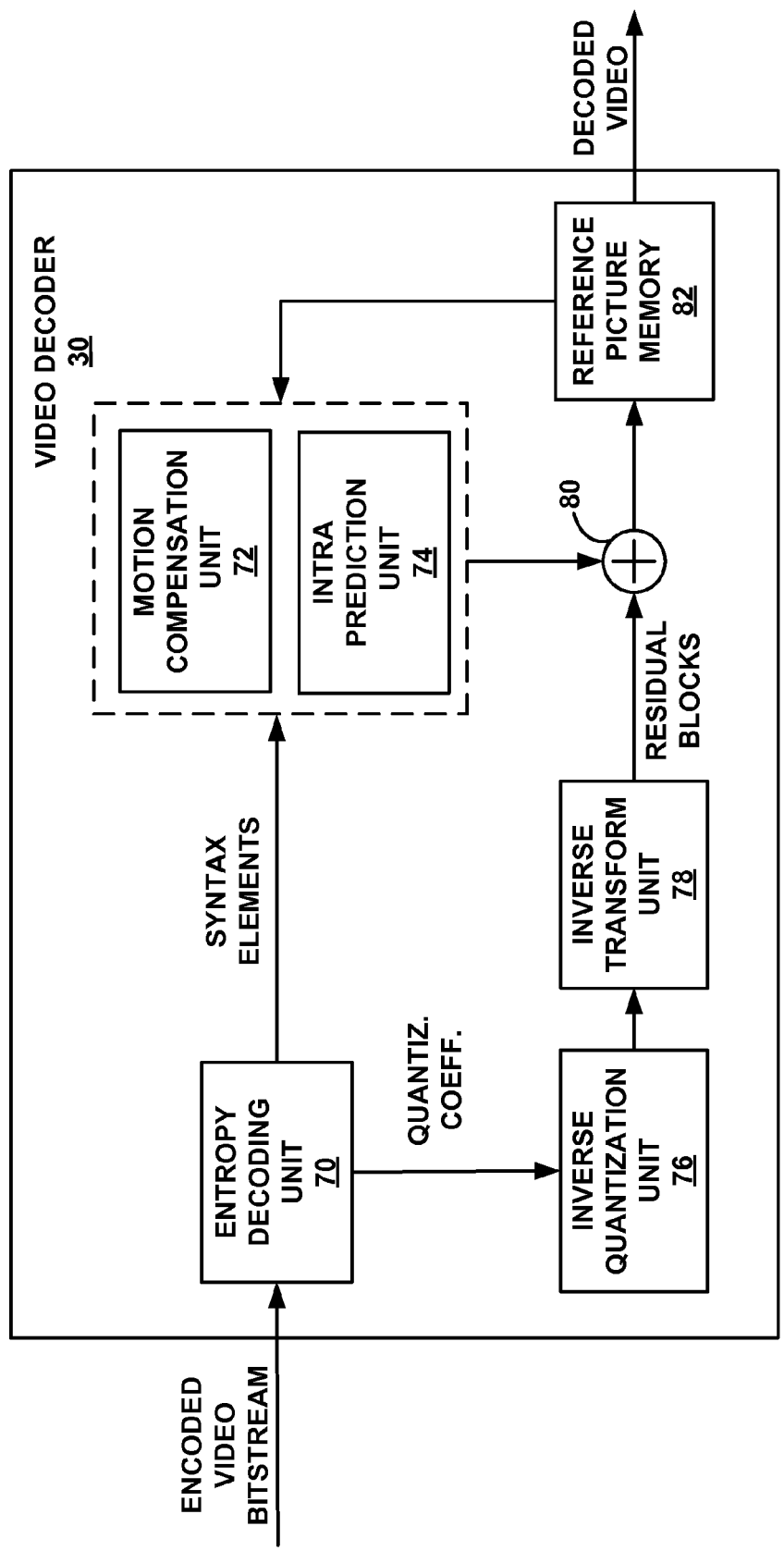
FIG. 3 is a block diagram illustrating an example of a video decoder that may implement techniques for signaling data for LTRPs in an SPS or slice header.

FIG. 3 is a block diagram illustrating an example of video decoder 30 that may implement techniques for signaling data for LTRPs in an SPS or slice header. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

As described above, during inter-prediction, motion compensation unit 72 may determine one or more reference pictures, that video decoder 30 may use to form the predictive video blocks for the current block being decoded. Motion compensation unit 72 may determine whether reference pictures are long term reference pictures or short-term reference pictures based on syntax elements of the coded video bitstream, which indicate whether a reference picture is marked for long term reference or short-term reference. Motion compensation unit 72 may store the reference pictures in a decoded picture buffer (DPB) until the pictures are marked as unused for reference.

Motion compensation unit 72 of video decoder 30 may decode various syntax elements that include identifying information for one or more reference pictures used to form predictive blocks for the currently decoding block. During the decoding of an inter-predicted PU, motion compensation unit 72 may decode identifying information of one or more LTRPs for the current picture which are signaled in the active sequence parameter set. Motion compensation unit 72 may also decode identifying information for one or more short-term reference pictures used for predicting the current picture in the slice header of the current picture or the picture parameter set for the current picture. In some examples, the syntax elements may indicate whether or not the slice header inherits long term reference pictures from the active sequence parameter set, or whether identifying information for the long term reference picture is explicitly signaled in the slice header.

In this manner, motion compensation unit 72 of video decoder 30 in FIG. 3 represents an example of a video decoder configured to code a slice header for a slice of video data, wherein the slice header includes a syntax element indicative of whether identifying information for a long term reference picture is explicitly signaled in the slice header or derived from a sequence parameter set corresponding to the slice, and, when the syntax element indicates that the identifying information for the long term reference picture is explicitly signaled, code a value for the identifying information for the long term reference picture in the slice header.

In some examples, video decoder 30 may decode the identifying information of the long term reference pictures based on only some of the LSBs of the POC values of the long term reference pictures signaled in the active SPS or the slice header. However, in some instances, two LTRPs may have the same POC LSBs, so video encoder 20 may additionally decode some of the MSBs of the POC values of the LTRPs to disambiguate LTRPs that have the same POC LSBs.

In another example of the techniques of this disclosure, video decoder 30 may code a list of LTRPs used to predict the pixel values of the current slice within the syntax elements of the current slice header. Video decoder 30 may code data for a plurality of pictures in a coding order. The data may indicate that each of the plurality of pictures is available for use as an LTRP. Video decoder 30 may code a syntax element in the slice header of the current picture that includes values for least significant bits (LSBs) of respective picture order count (POC) values of the plurality of pictures such that the values for the LSBs are either non-decreasing or non-increasing in the picture coding order.

Based on the reference pictures signaled in the SPS, PPS, and slice header, video decoder 30 constructs subsets of reference pictures, such as the RefPicSetStCurrBefore, RefPicSetStCurrAfter, RefPicSetStFoll, RefPicSetLtCurr and RefPicSetLtFoll reference picture subsets. Video decoder 30 may construct the reference picture lists based on the POC values of the reference pictures. Based on the five reference picture lists, video decoder 30 may also construct the RefPicList0 and RefPicList1 reference picture lists. Video decoder 30 may use the reference pictures of included in the RefPicList0 and RefPicList1 to predict the pixel values of a bi-predicted block, and the reference pictures of RefPicList0 to predict the pixel values of a uni-predicted block.

Figure 4:
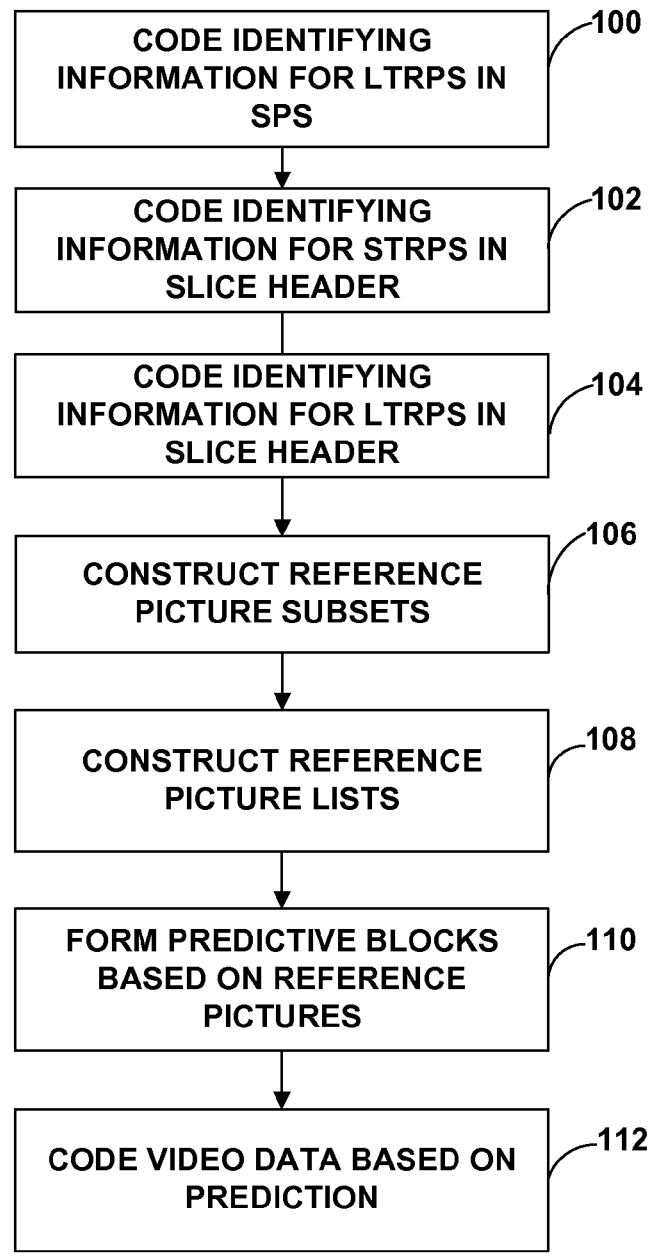
FIG. 4 is a flowchart illustrating a process for coding data for reference pictures in accordance with one or more examples described in this disclosure.

FIG. 4 is a flowchart illustrating a process for coding data for reference pictures in accordance with one or more examples described in this disclosure. For purposes of illustration only, the method of FIG. 4 may be performed by a video coder corresponding to either video encoder 20 or video decoder 30. In the method of FIG. 4, the video coder may code identifying information for long term reference pictures in an active sequence parameter set (SPS) (100). In some examples, the identifying information may include LSBs of POC values for the LTRPs.

The video coder may also code one or more syntax elements that include identifying information for one or more short-term reference pictures in the SPS and the slice header for the picture currently being coding (102).

In addition to coding identifying information for LTRPs in the SPS, the video coder may also code identifying information for the LTRPs in a current slice header of the currently coding picture (104). The slice header may include a syntax element comprising a list of LTRPs for the current slice. In some examples, at least some of the LTRPs in the list are inherited from the active SPS, and some of the LTRPs in the list are coded in the current slice header. The process of coding the inherited SPS is described in greater detail below with respect to FIG. 5.

After coding the LTRPs and STRPs, the video coder may construct reference picture subsets. In some examples, the reference picture subsets, such as the RefPicSetStCurrBefore, RefPicSetStCurrAfter, RefPicSetStFoll, RefPicSetLt-Curr and RefPicSetLtFoll reference picture subsets (106). Based on the reference picture subsets, the video coder constructs the reference picture lists, RefPicList0, and RefPicList1 (108). The video coder may employ default construction techniques to construct the reference picture lists. The video coder may also modify the order of the reference pictures in RefPicList0 and RefPicList1 based on syntax elements that specify a different order for the reference pictures.

After constructing the reference picture lists the video coder may form predictive blocks for the currently coding picture based on the reference pictures of the reference pictures lists (110). During encoding, the video coder may predict a portion of the video data of the slice using the long term reference picture and code the portion of the video data based on the prediction (112).

Figure 5:
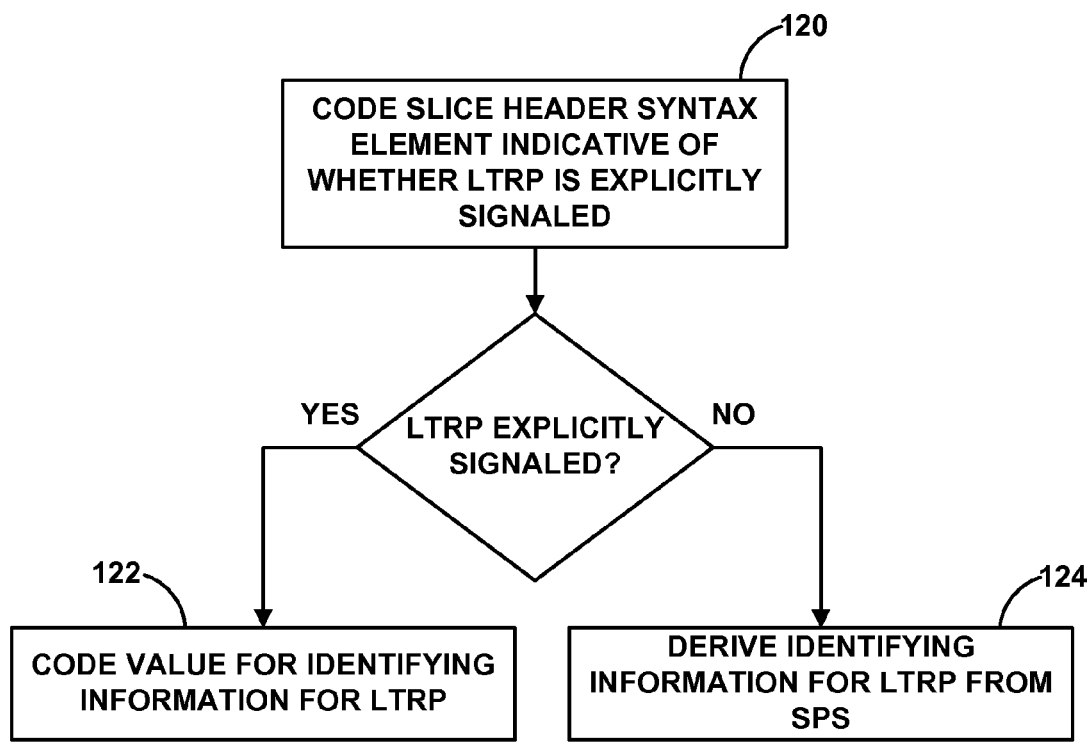
FIG. 5 is a flowchart illustrating a process for signaling data for LTRPs in an SPS or slice header in accordance with one or more examples described in this disclosure.

FIG. 5 is a flowchart illustrating a process for coding data for LTRPs in an SPS or slice header in accordance with one or more examples described in this disclosure. For purposes of illustration only, the method of FIG. 5 may be performed by a video coder corresponding to either video encoder 20 or video decoder 30. In the method of FIG. 5, the video coder may code a slice header for a slice of video data (120). In some examples, the slice header may be a slice header for the currently coding picture.

The slice header includes a syntax element indicative of whether identifying information for an LTRP is explicitly signaled in the slice header or derived from a sequence parameter set corresponding to the slice. If the syntax element indicates that the identifying information for the LTRP is explicitly signaled, the video coder may code a value for the identifying information for the long term reference picture in the slice header (122). If the syntax element does not indicate that the identifying information for the LTRP is explicitly signaled, the video coder may derive the identifying information for the LTRP from the sequence parameter set when the syntax element indicates that the identifying information for the long term reference picture is not explicitly signaled (124).

In some examples, the video coding device configured to perform the process of FIG. 5 may be further configured to store a first decoded picture corresponding to the first picture in a decoded picture buffer. When the decoded picture buffer contains more than one reference picture that is marked as "used for reference" and that has the same value of least significant bits (LSBs) of picture order count (POC) as the first picture, to code the identifying information, the device is further configured to code a first syntax element equal to one in the slice header of a slice of a second picture. When the decoded picture buffer does not contain more than one picture that is marked as "used for reference" and that has the same POC LSBs value as the first picture, to code the identifying information, the device may be configured to code the first syntax element equal to zero in the slice header. When the first syntax element is equal to one, to code the identifying information, the device is further configured to code a second syntax element indicative of most significant bits (MSBs) of a POC value of the first picture and to code the second picture using the first picture as a long term reference picture.

In some examples, the video coder configured to perform the process of FIG. 5 may be further configured to code data for a plurality of pictures in a picture coding order. The data may indicate that the plurality of pictures are each available for use as long term reference pictures. The video coder may also code values for least significant bits (LSBs) of picture order count (POC) values of the plurality of pictures such that the values for the LSBs are either non-decreasing or non-increasing in the picture coding order.

In another example, to code the values for the LSBs, the video coder may be configured to code the values for the LSBs such for any values of j and k, where j and k are integers, in the range of zero to a number of long term reference pictures minus one, the LSBs of the POC value of a first picture of the plurality of pictures at position j in a list of reference pictures are greater than or equal to, or less than equal to, the LSBs of the POC value of a second picture of the plurality of pictures at position k in the list of reference pictures. The video coder may further be configured to code an SPS including information indicative of the number of LTRPs.

In yet another example, the data for the plurality of pictures may further indicate whether the plurality of pictures are used for reference, and for each of the plurality of pictures that is indicated as used for reference, the data may further include data for determining whether the values of most significant bits (MSBs) of the POC values for each of the pictures are coded.

In another example, the video coder may determine a DeltaPocMSBCycleLt variable value, where a value of DeltaPocMSBCycleLt of one of the plurality of pictures is equal to a value for a syntax element delta_poc_msb_cycle_lt for the one of the plurality of pictures when the one of the plurality of pictures has a coding order value equal to a number of long term reference pictures specified in a sequence parameter set.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding syntax element data for a plurality of pictures in a picture coding order, wherein the syntax element data indicates that each of the plurality of pictures is available for use as a long term reference picture;
    decoding a slice header for a slice of the video data, wherein the slice header includes a syntax element indicating a number of long term reference pictures derived from a sequence parameter set;
    determining whether a long term reference picture of the plurality of pictures is explicitly signaled in the slice header or derived from the sequence parameter set corresponding to the slice;
    when the long term reference picture is explicitly signaled, decoding the slice header further comprises decoding a value for identifying information for the long term reference picture in the slice header; and
    determining that a value for DeltaPocMSBCycleLt [i] of the long term reference picture having index value i is always equal to a value for a syntax element delta_poc_msb_cycle_lt_[i] of the long term reference picture having index value i when the long term reference picture has the index value i equal to the number of long term reference pictures derived from the sequence parameter set.

2. The method of claim 1, wherein the long term reference picture comprises a first picture, the method further comprising:
   storing a first decoded picture corresponding to the first picture in a decoded picture buffer;
   when the decoded picture buffer contains more than one reference picture that is marked as "used for reference" and that has the same value of least significant bits (LSBs) of picture order count (POC) as the first picture, wherein decoding the value for the identifying information further comprises: decoding a first syntax element equal to one in the slice header of a slice of a second picture;
   when the decoded picture buffer does not contain more than one picture that is marked as "used for reference" and that has the same POC LSBs value as the first picture, wherein decoding the value for the identifying information further comprises: decoding the first syntax element equal to zero in the slice header; and
   when the first syntax element is equal to one, decoding the value for the identifying information further comprises: decoding a second syntax element indicative of most significant bits (MSBs) of a POC value of the first picture; and
   decoding the second picture using the first picture as a long term reference picture.

3. The method of claim 1, further comprising:
   deriving the long term reference picture from the sequence parameter set based on a determination that the long term reference picture is derived.

4. The method of claim 1, the method further comprising:
   decoding a syntax element in the slice header of the current picture, wherein the syntax element includes values for least significant bits (LSBs) of respective picture order count (POC) values of the plurality of pictures such that the values for the LSBs are either non-decreasing or non-increasing in the picture coding order.

5. The method of claim 4, wherein decoding the values for the LSBs comprises decoding the values of the LSBs such that for any values of j and k, where j and k are integers in the range of zero to a number of long term reference pictures derived from the sequence parameter set minus one, the LSBs of the POC value of a first picture of the plurality of pictures at position j in a list of reference pictures signaled in the slice header are greater than or equal to the LSBs of the POC value of a second picture of the plurality of pictures at position k in the list of reference pictures.

6. The method of claim 5, further comprising decoding the sequence parameter set including information indicative of the number of long term reference pictures.

7. The method of claim 4, wherein decoding the values for the LSBs comprises decoding the values of the LSBs such that for any values of j and k, where j and k are integers, in the range of zero to a number of long term reference pictures derived from the sequence parameter set minus one, the LSBs of the POC value of a first picture of the plurality of pictures at position j in a list of reference pictures signaled in the slice header are less than or equal to the LSBs of the POC value of a second picture of the plurality of pictures at position k in the list of reference pictures.

8. The method of claim 7, further comprising decoding the sequence parameter set including information indicative of the number of long term reference pictures.

9. The method of claim 1, wherein the video data indicates values of most significant bits (MSBs) of the POC values of the plurality of pictures.

10. The method of claim 1, wherein the long term reference picture comprises a first picture, wherein decoding further comprises decoding a second picture using the first picture as a long term reference picture.

11. The method of claim 1, further comprising predicting a portion of the video data of the slice using the long term reference picture and decoding the portion of the video data based on the prediction.

12. A method of encoding video data, the method comprising:
    encoding syntax element data for a plurality of pictures in a picture coding order, wherein the syntax element data indicates that each of the plurality of pictures is available for use as a long term reference picture;
    encoding a slice header for a slice of the video data, wherein the slice header includes a syntax element indicating a number of long term reference pictures derived from a sequence parameter set;
    determining whether a long term reference picture of the plurality of pictures is explicitly signaled in the slice header or derived from the sequence parameter set corresponding to the slice;
    when the long term reference picture is explicitly signaled, wherein encoding the slice header further comprises encoding a value for identifying information for the long term reference picture in the slice header; and
    determining that a value for DeltaPocMSBCycleLt [i] of the long term reference picture having index value i is always equal to a value for a syntax element delta_poc_msb_cycle_lt_[i] of the long term reference picture having index value i when the long term reference picture has the index value i equal to the number of long term reference pictures derived from the sequence parameter set.

13. The method of claim 12, wherein the long term reference picture comprises a first picture, the method further comprising:
    storing a first decoded picture corresponding to the first picture in a decoded picture buffer;
    when the decoded picture buffer contains more than one reference picture that is marked as "used for reference" and that has the same value of least significant bits (LSBs) of picture order count (POC) as the first picture, wherein encoding the value for the identifying information further comprises: encoding a first syntax element equal to one in the slice header of a slice of a second picture;
    when the decoded picture buffer does not contain more than one picture that is marked as "used for reference" and that has the same POC LSBs value as the first picture, wherein encoding the value for the identifying information further comprises: encoding the first syntax element equal to zero in the slice header; and
    when the first syntax element is equal to one, encoding the value for the identifying information further comprises: encoding a second syntax element indicative of most significant bits (MSBs) of a POC value of the first picture; and
    encoding the second picture using the first picture as a long term reference picture.

14. The method of claim 12, further comprising:
    deriving the long term reference picture from the sequence parameter set based on a determination that the long term reference picture is derived.

15. The method of claim 12, the method further comprising:
encoding a syntax element in the slice header of the current picture, wherein the syntax element includes values for least significant bits (LSBs) of respective picture order count (POC) values of the plurality of pictures such that the values for the LSBs are either non-decreasing or non-increasing in the picture coding order.

16. The method of claim 15, wherein encoding the values for the LSBs comprises encoding the values of the LSBs such that for any values of j and k, where j and k are integers in the range of zero to a number of long term reference pictures derived from the sequence parameter set minus one, the LSBs of the POC value of a first picture of the plurality of pictures at position j in a list of reference pictures signaled in the slice header are greater than or equal to the LSBs of the POC value of a second picture of the plurality of pictures at position k in the list of reference pictures.

17. The method of claim 16, further comprising encoding the sequence parameter set including information indicative of the number of long term reference pictures.

18. The method of claim 15, wherein encoding the values for the LSBs comprises encoding the values of the LSBs such that for any values of j and k, where j and k are integers, in the range of zero to a number of long term reference pictures derived from the sequence parameter set minus one, the LSBs of the POC value of a first picture of the plurality of pictures at position j in a list of reference pictures signaled in the slice header are less than or equal to the LSBs of the POC value of a second picture of the plurality of pictures at position k in the list of reference pictures.

19. The method of claim 18, further comprising encoding the sequence parameter set including information indicative of the number of long term reference pictures.

20. The method of claim 12, wherein the video data further indicates values of most significant bits (MSBs) of the POC values of the plurality of pictures.

21. The method of claim 12, wherein the long term reference picture comprises a first picture, wherein encoding further comprises encoding a second picture using the first picture as a long term reference picture.

22. The method of claim 12, further comprising predicting a portion of the video data of the slice using the long term reference picture and encoding the portion of the video data based on the prediction.

23. A device for coding video, the device comprising:
means for coding syntax element data for a plurality of pictures in a picture coding order, wherein the syntax element data indicates that each of the plurality of pictures is available for use as a long term reference picture;
means for coding a slice header for a slice of the video data, wherein the slice header includes a syntax element indicating a number of long term reference pictures derived from a sequence parameter set;
means for determining whether a long term reference picture of the plurality of pictures is explicitly signaled in the slice header or derived from the sequence parameter set corresponding to the slice;
the means for coding the slice header further comprising means for coding a value for identifying information for the long term reference picture in the slice header when the long term reference picture is explicitly signaled; and
means for determining that a value for DeltaPocMSBCycleLt [i] of the long term reference picture having index value i is always equal to a value for a syntax element delta_poc_msb_cycle_lt_[i] of the long term reference picture having index value i when the long term reference picture has the index value i equal to the number of long term reference pictures derived from the sequence parameter set.

24. The device of claim 23, further comprising:
means for deriving the long term reference picture from the sequence parameter set based on a determination that the long term reference picture is derived.

25. The device of claim 23, the device further comprising:
means for coding a syntax element in the slice header of the current picture, wherein the syntax element includes values for least significant bits (LSBs) of respective picture order count (POC) values of the plurality of pictures such that the values for the LSBs are either non-decreasing or non-increasing in the picture coding order.

26. The device of claim 23, wherein the means for coding the values for the LSBs comprises means for coding the values for the LSBs such that for any values of j and k, where j and k are integers, in the range of zero to a number of long term reference pictures derived from the sequence parameter set minus one, the LSBs of the POC value of a first picture of the plurality of pictures at position j in a list of reference pictures signaled in the slice header are greater than or equal to the LSBs of the POC value of a second picture of the plurality of pictures at position k in the list of reference pictures.

27. The device of claim 26, further comprising means for coding the sequence parameter set including information indicative of the number of long term reference pictures.

28. The device of claim 25, wherein the means for coding the values for the LSBs comprises means for coding the values for the LSBs such that for any values of j and k, where j and k are integers, in the range of zero to a number of long term reference pictures derived from the sequence parameter set minus one, the LSBs of the POC value of a first picture of the plurality of pictures at position j in a list of reference pictures signaled in the slice header are less than or equal to the LSBs of the POC value of a second picture of the plurality of pictures at position k in the list of reference pictures.

29. The device of claim 28, further comprising means for coding the sequence parameter set including information indicative of the number of long term reference pictures.

30. The device of claim 23, wherein the video data further indicates values of most significant bits (MSBs) of the POC values of the plurality of pictures.

31. The device of claim 23, wherein the long term reference picture comprises a first picture, wherein coding comprises means for decoding a second picture using the first picture as a long term reference picture.

32. The device of claim 23, wherein the long term reference picture comprises a first picture, wherein the means for coding comprises means for encoding a second picture using the first picture as a long term reference picture.

33. The device of claim 23, further comprising means for predicting a portion of the video data of the slice using the long term reference picture and means for coding the portion of the video data based on the prediction.

34. A device for coding video data, the device comprising:
a memory configured to store the video data; and
one or more processors configured to:
code syntax element data for a plurality of pictures in a picture coding order, wherein the syntax element data indicates that each of the plurality of pictures is available for use as a long term reference picture;

code a slice header for a slice of the video data, wherein the slice header includes a syntax element indicating a number of long term reference pictures derived from sequence parameter set;

determine whether a long term reference picture of the plurality of pictures is explicitly signaled in the slice header or derived from the sequence parameter set corresponding to the slice;

when the long term reference picture is explicitly signaled, decode a value for identifying information for the long term reference picture in the slice header; and determine that a value for DeltaPocMSBCycleLt [i] of the long term reference picture having index value i is always equal to a value for a syntax element delta_poc_msb_cycle_lt_[i] of the long term reference picture having index value i when the long term reference picture has the index value i equal to the number of long term reference pictures derived from the sequence parameter set.

35. The device of claim 34, wherein the long term reference picture comprises a first picture, wherein the one or more processors are further configured to:

store a first decoded picture corresponding to the first picture in a decoded picture buffer;

when the decoded picture buffer contains more than one reference picture that is marked as "used for reference" and that has the same value of least significant bits (LSBs) of picture order count (POC) as the first picture, to code the value for the identifying information, the one or more processors are further configured to: code a first syntax element equal to one in the slice header of a slice of a second picture;

when the decoded picture buffer does not contain more than one picture that is marked as "used for reference" and that has the same POC LSBs value as the first picture, to code the value for the identifying information, the one or more processors are further configured to:

code the first syntax element equal to zero in the slice header; and when the first syntax element is equal to one, to code the value for the identifying information, the one or more processors are further configured to: code a second syntax element indicative of most significant bits (MSBs) of a POC value of the first picture; and code the second picture using the first picture as a long term reference picture.

36. The device of claim 34, wherein the one or more processors are further configured to:

derive the long term reference picture from the sequence parameter set based on a determination that the long term reference picture is derived.

37. The device of claim 34, wherein the one or more processors are further configured to:

code values for least significant bits (LSBs) of picture order count (POC) values of the plurality of pictures such that the values for the LSBs are either non-decreasing or non-increasing in the picture coding order.

38. The device of claim 37, wherein to code the values for the LSBs, the one or more processors are configured to code the values for the LSBs such for any values of j and k, where j and k are integers, in the range of zero to a number of long term reference pictures derived from the sequence parameter set minus one, the LSBs of the POC value of a first picture of the plurality of pictures at position j in a list of reference pictures signaled in the slice header are greater than or equal to the LSBs of the POC value of a second picture of the plurality of pictures at position k in the list of reference pictures.

39. The device of claim 38, wherein the one or more processors are further configured to code the sequence parameter set including information indicative of the number of long term reference pictures.

40. The device of claim 37, wherein to code the values for the LSBs the one or more processors are configured to code the values for the LSBs such that for any values of j and k, where j and k are integers, in the range of zero to a number of long term reference pictures derived from the sequence parameter set minus one, the LSBs of the POC value of a first picture of the plurality of pictures at position j in a list of reference pictures signaled in the slice header are less than or equal to the LSBs of the POC value of a second picture of the plurality of pictures at position k in the list of reference pictures signaled in the slice header.

41. The device of claim 40 wherein the one or more processors are further configured to code the sequence parameter set including information indicative of the number of long term reference pictures.

42. The device of claim 34, wherein the video data further indicates values of most significant bits (MSBs) of the POC values of the plurality of pictures.

43. The device of claim 34, wherein the long term reference picture comprises a first picture, wherein to code, the one or more processors are configured to decode a second picture using the first picture as a long term reference picture.

44. The device of claim 34 wherein the long term reference picture comprises a first picture, wherein to code, the one or more processors are configured to encode a second picture using the first picture as a long term reference picture.

45. The device of claim 34, wherein the device comprises at least one of:
an integrated circuit;
a microprocessor; or
a wireless communication device.

46. The device of claim 34, wherein the one or more processors are further configured to predict a portion of the video data of the slice using the long term reference picture and coding the portion of the video data based on the prediction.

47. A non-transitory computer-readable storage medium having stored thereon instructions that, when executed, cause a processor to:

code syntax element data for a plurality of pictures in a picture coding order, wherein the syntax element data indicates a number of long term reference pictures derived from a sequence parameter set;

code a slice header for a slice of the video data, wherein the slice header includes a syntax element comprising identifying information for a long term reference picture of the plurality of pictures;

determine whether a long term reference picture of the plurality of pictures is explicitly signaled in the slice header or derived from the sequence parameter set corresponding to the slice;

when the syntax element indicates that the identifying information for the long term reference picture is explicitly signaled, to code the slice header, the instructions cause the processor to code a value for identifying information for the long term reference picture in the slice header; and determine that a value for DeltaPocMSBCycleLt [i] of the long term reference picture having index value i is always equal to a value for a syntax element delta_poc_msb_cycle_lt_[i] of the long term reference picture having index value i when the long term reference picture has the index value i equal to the number of long term reference pictures derived from the sequence parameter set.

48. The computer-readable medium of claim 47, further comprising instructions that cause the processor to:
derive the long term reference picture from the sequence parameter set when the value for the identifying information indicates that the long term reference picture is not explicitly signaled.

49. The computer-readable storage of claim 47, further comprising instructions that cause the processor to:
code values for least significant bits (LSBs) of picture order count (POC) values of the plurality of pictures such that the values for the LSBs are either non-decreasing or non-increasing in the picture coding order.

50. The computer-readable medium of claim 49, wherein the instructions that cause the processor code the values for the LSBs comprise instructions that cause the processor to code the values for the LSBs such that for any values of j and k, where j and k are integers, in the range of zero to a number of long term reference pictures derived from the sequence parameter set minus one, the LSBs of the POC value of a first picture of the plurality of pictures at position j in a list of reference pictures signaled in the slice header are greater than or equal to the LSBs of the POC value of a second picture of the plurality of pictures at position k in the list of reference pictures.

51. The computer-readable medium of claim 50, further comprising instructions that cause the processor to code the sequence parameter set including information indicative of the number of long term reference pictures.

52. The computer-readable medium of claim 49, wherein the instructions that cause the processor to code the values for the LSBs comprise instructions that cause the processor to code the values for the LSBs such that for any values of j and k, where j and k are integers, in the range of zero to a number of long term reference pictures derived from the sequence parameter set minus one, the LSBs of the POC value of a first picture of the plurality of pictures at position j in a list of reference pictures signaled in the slice header are less than or equal to the LSBs of the POC value of a second picture of the plurality of pictures at position k in the list of reference pictures.

53. The computer-readable medium of claim 52, further comprising instructions that, when executed, cause the processor to code the sequence parameter set including information indicative of the number of long term reference pictures.

54. The computer-readable medium of claim 47, wherein the video data further includes values of most significant bits (MSBs) of the POC values of the plurality of pictures.

55. The computer-readable medium of claim 47, wherein the long term reference picture comprises a first picture, wherein the instructions that cause the processor to code comprise instructions that cause the processor to decode a second picture using the first picture as a long term reference picture.

56. The computer-readable medium of claim 47, wherein the long term reference picture comprises a first picture, wherein the instructions further cause the processor to encode a second picture using the first picture as a long term reference picture.

\* \* \* \* \*